US009975976B1

(12) United States Patent
Tso et al.

(10) Patent No.: US 9,975,976 B1
(45) Date of Patent: May 22, 2018

(54) POLYETHYLENE COMPOSITIONS AND METHODS OF MAKING AND USING SAME

(71) Applicant: Chevron Phillips Chemical Company LP, The Woodlands, TX (US)

(72) Inventors: Chung Tso, Bartlesville, OK (US); Jared L. Barr, Bartlesville, OK (US); Kelly Frey, Owasso, OK (US); Carlos A. Cruz, Bartlesville, OK (US); Youlu Yu, Bartlesville, OK (US); Bill Bridendolph, Ochelata, OK (US); Qing Yang, Bartlesville, OK (US); Yongwoo Inn, Bartlesville, OK (US); William Fisher, Bartlesville, OK (US); Max P. McDaniel, Bartlesville, OK (US); Ashish M. Sukhadia, Bartlesville, OK (US); Brandy Rutledge-Ryal, Bartlesville, OK (US); Daniel G. Hert, Owasso, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days. days.

(21) Appl. No.: 15/489,663

(22) Filed: Apr. 17, 2017

(51) Int. Cl.
*C08F 210/16* (2006.01)
*C09D 123/08* (2006.01)
*C08J 7/04* (2006.01)
*B32B 7/00* (2006.01)
*B32B 27/32* (2006.01)
*B32B 37/15* (2006.01)
*C08F 210/14* (2006.01)

(52) U.S. Cl.
CPC .......... *C08F 210/16* (2013.01); *B32B 7/005* (2013.01); *B32B 27/327* (2013.01); *B32B 37/153* (2013.01); *C08J 7/047* (2013.01); *C09D 123/0815* (2013.01); *B32B 2250/02* (2013.01); *B32B 2307/72* (2013.01); *B32B 2323/046* (2013.01); *C08F 210/14* (2013.01); *C08F 2500/26* (2013.01); *C08J 2323/20* (2013.01)

(58) Field of Classification Search
None
See application file for complete search history.

(56) References Cited

U.S. PATENT DOCUMENTS

| 3,248,179 | A | 4/1966 | Norwood |
|---|---|---|---|
| 4,060,480 | A | 11/1977 | Reed et al. |
| 4,452,910 | A | 6/1984 | Hopkins et al. |
| 4,501,885 | A | 2/1985 | Sherk et al. |
| 4,588,790 | A | 5/1986 | Jenkins, III et al. |
| 5,352,749 | A | 10/1994 | DeChellis et al. |
| 5,376,611 | A | 12/1994 | Shveima |
| 5,436,304 | A | 7/1995 | Griffin et al. |
| 5,455,314 | A | 10/1995 | Burns et al. |
| 5,565,175 | A | 10/1996 | Hottovy et al. |
| 5,575,979 | A | 11/1996 | Hanson |
| 5,919,983 | A | 7/1999 | Rosen et al. |
| 6,107,230 | A | 8/2000 | McDaniel et al. |
| 6,165,929 | A | 12/2000 | McDaniel et al. |
| 6,239,235 | B1 | 5/2001 | Hottovy et al. |
| 6,262,191 | B1 | 7/2001 | Hottovy et al. |
| 6,294,494 | B1 | 9/2001 | McDaniel et al. |
| 6,300,271 | B1 | 10/2001 | McDaniel et al. |
| 6,316,553 | B1 | 11/2001 | McDaniel et al. |
| 6,355,594 | B1 | 3/2002 | McDaniel et al. |
| 6,376,415 | B1 | 4/2002 | McDaniel et al. |
| 6,388,017 | B1 | 5/2002 | McDaniel et al. |
| 6,391,816 | B1 | 5/2002 | McDaniel et al. |
| 6,395,666 | B1 | 5/2002 | McDaniel et al. |
| 6,524,987 | B1 | 2/2003 | Collins et al. |
| 6,548,441 | B1 | 4/2003 | McDaniel et al. |
| 6,548,442 | B1 | 4/2003 | McDaniel et al. |
| 6,576,583 | B1 | 6/2003 | McDaniel et al. |
| 6,613,712 | B1 | 9/2003 | McDaniel et al. |
| 6,632,894 | B1 | 10/2003 | McDaniel et al. |
| 6,667,274 | B1 | 12/2003 | Hawley et al. |
| 6,750,302 | B1 | 6/2004 | McDaniel et al. |
| 6,833,415 | B2 | 12/2004 | Kendrick et al. |
| 7,026,494 | B1 | 4/2006 | Yang et al. |
| 7,041,617 | B2 | 5/2006 | Jensen et al. |
| 7,226,886 | B2 | 6/2007 | Jayaratne et al. |
| 7,312,283 | B2 | 12/2007 | Martin et al. |
| 7,456,243 | B2 | 11/2008 | Jensen et al. |
| 7,842,763 | B2 | 11/2010 | Jensen et al. |
| 7,884,163 | B2 | 2/2011 | McDaniel et al. |
| 8,030,241 | B2 | 10/2011 | Jensen et al. |
| 8,426,538 | B2 | 4/2013 | Jensen et al. |
| 9,346,896 | B2 | 5/2016 | McDaniel et al. |
| 2005/0153830 | A1* | 7/2005 | Jensen ............... C08F 10/00 502/117 |

(Continued)

OTHER PUBLICATIONS

Bird, R. B., et al., "Dynamics of Polymeric Liquids," Fluid Mechanics, vol. 1, Second Edition, 1987, cover page, publishing page, pp. xiii-xviii, and 171-172, John Wiley & Sons, Inc.
Cotton, F. A., et al., Advanced Inorganic Chemistry, Mar. 30, 1999, 6th ed., cover page, title page, pp. ix-x and publishing information, John Wiley & Sons, Inc.
Hieber, C. A., et al., "Shear-rate-dependence modeling of polymer melt viscosity," Polymer Engineering and Science, Jul. 1992, pp. 931-938, vol. 32, No. 14.
Hieber, C. A., et al., "Some correlations involving the shear viscosity of polystyrene melts," Rheol Acta, 1989, pp. 321-332, vol. 28.
Li, H., et al., "Coordination Copolymerization of Severely Encumbered Isoalkenes with Ethylene: Enhanced Enchainment Mediated by Binuclear Catalysts and Cocatalysts," Journal of the American Chemical Society, Sep. 2005, pp. 14756-14768, vol. 127, Issue 42, American Chemical Society.

(Continued)

Primary Examiner — Richard A Huhn
(74) Attorney, Agent, or Firm — Conley Rose, P.C.; Rodney B. Carroll; Chad E. Walter

(57) ABSTRACT

A polyolefin having a density of greater than about 0.930 g/ml which when extruded at a temperature in the range of from about 590° F. to about 645° F. and then coated onto a substrate at a rate of from about 300 ft/min to about 1000 ft/min has an edge weave of from about 0 in/side to about 2.5 in/side and a neck-in of less than about 3.0 in/side.

23 Claims, No Drawings

(56) References Cited

U.S. PATENT DOCUMENTS

2013/0123414 A1    5/2013  Landry, Jr. et al.

OTHER PUBLICATIONS

Hawley's Condensed Chemical Dictionary, Eleventh Edition, cover page, contents page, pp. 862-863, Van Nostrand Reinhold Company.
Pinnavaia, T. J., "Intercalated Clay Catalysts," Apr. 22, 1983, pp. 365-371, vol. 220, No. 4595, Science.
Rydholm, A. E., et al., "Gel Permeation Chromatography Characterization of the Chain Length Distributions in Thiol-Acrylate Photopolymer Networks," Macromolecules, 2006, pp. 7882-7888, vol. 39, Issue 23, American Chemical Society.
Thomas, J. M., "Sheet silicate intercalates: new agents for unusual chemical conversions," Intercalation Chemistry, 1982, Chapter 3, pp. 55-99, Academic Press, Inc.

* cited by examiner

US 9,975,976 B1

POLYETHYLENE COMPOSITIONS AND METHODS OF MAKING AND USING SAME

TECHNICAL FIELD

The present disclosure relates to polymer, e.g., polyolefins such as polyethylene, compositions having improved processability.

BACKGROUND

Polyolefins are plastic materials useful for making a wide variety of valued products due to their combination of features such as stiffness, ductility, barrier properties, temperature resistance, optical properties, availability and low cost. In particular, polyethylene (PE) is one of the largest volume polymers consumed in the world. It is a versatile polymer that offers high performance relative to other polymers and alternative materials such as glass or metal. An ongoing need exists for improved polymers and polymer compositions displaying desired processing characteristics with the ability to extend their application utility.

SUMMARY

Disclosed herein is a polyolefin having a density of greater than about 0.930 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side.

Also disclosed herein is a polyolefin having a density of greater than about 0.930 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side, a neck-in of less than about 3.0 in/side, and short chain branching comprising ethyl moieties, butyl moieties, hexyl moieties, 4-methylpentyl moieties, octyl moieties or combinations thereof.

Also disclosed herein is a polyolefin having a density of from about 0.89 g/ml to about 0.98 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side wherein the polyolefin has short chain branching comprising ethyl groups, butyl groups, hexyl groups, 4-methylpentyl groups, octyl groups or combinations thereof.

Also disclosed herein is a polyolefin having a density of from about 0.915 g/ml to about 0.975 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side wherein the polyolefin has short chain branching comprising ethyl groups, butyl groups, hexyl groups, 4-methylpentyl groups, octyl groups or combinations thereof.

Also disclosed herein is a polyolefin having a melt index of from about 0 g/10 min. to about 50 g/10 min. which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side wherein the polyolefin has short chain branching comprising $C_1$ groups and $C_{2+n}$ groups where n is an even number.

DETAILED DESCRIPTION

Disclosed herein are polymers with improved processing characteristics. The polymer may comprise a metallocene-catalyzed polymer, alternatively a metallocene-catalyzed polyethylene. In some aspects, a polymer suitable for use in the present disclosure is prepared via a low pressure process utilizing less than about 15,000 psi monomer (e.g., ethylene) in the reactor. Herein polymers suitable for use in extrusion coating applications and prepared using a low-pressure process are designated low pressure extrusion polymers (LPEP).

An LPEP of the present disclosure can be formed using any suitable olefin polymerization method which may be carried out using various types of polymerization reactors. As used herein, "polymerization reactor" includes any polymerization reactor capable of polymerizing olefin monomers to produce homopolymers or copolymers. Such homopolymers and copolymers are referred to as resins or polymers.

In an aspect, the reaction zone of any process, system, or reaction system described herein can comprise an autoclave reactor, continuous stirred tank reactor, a loop reactor, a gas phase reactor, a solution reactor, a tubular reactor, a recycle reactor, a bubble reactor, or any combination thereof; alternatively, autoclave reactor; alternatively, stirred tank reactor; alternatively, a loop reactor; alternatively, a gas phase reactor; alternatively, a solution reactor; alternatively, a tubular reactor; alternatively, a recycle reactor; or alternatively, a bubble reactor. In some aspects, the reaction zone can comprise multiple reactors; or alternatively, only one reactor. When multiple reactors are present, each of the reactors can be the same or different types of reactors. The reaction zone can comprise single or multiple reactors of any of the types disclosed herein operating in batch or continuous mode; or alternatively, in continuous mode.

Continuous processes could use intermittent or continuous product discharge. Processes may also include partial or full direct recycle of un-reacted monomer, un-reacted co-monomer, and/or diluent.

Production of polymers in multiple reactors may include several stages in at least two separate polymerization reactors interconnected by a transfer device making it possible to transfer the polymers resulting from the first polymerization reactor into the second reactor. The desired polymerization conditions in one of the reactors may be different from the operating conditions of the other reactors. Alternatively, polymerization in multiple reactors may include the manual transfer of polymer from one reactor to subsequent reactors for continued polymerization. Multiple reactor systems may include any combination including, but not limited to, multiple loop reactors, multiple gas reactors, multiple solution reactors or a combination of loop and gas reactors. The multiple reactors may be operated in series or in parallel.

According to one aspect of the disclosure, the polymerization reactor system may comprise at least one loop slurry reactor comprising vertical and/or horizontal loops. Monomer, diluent, catalyst and optionally any co-monomer may be continuously fed to a loop reactor where polymerization occurs. Generally, continuous processes may comprise the continuous introduction of a monomer, a catalyst, and a diluent into a polymerization reactor and the continuous removal from this reactor of a suspension comprising polymer particles and the diluent. Reactor effluent may be flashed to remove the solid polymer from the liquids that comprise the diluent, monomer and/or co-monomer. Various technologies may be used for this separation step including but not limited to, flashing that may include any combination of heat addition and pressure reduction; separation by cyclonic action in either a cyclone or hydrocyclone; or separation by centrifugation.

A suitable slurry polymerization process (also known as the particle form process), is disclosed, for example, in U.S. Pat. Nos. 3,248,179, 4,501,885, 5,565,175, 5,575,979, 6,239,235, 6,262,191, and 6,833,415, each of which is incorporated by reference herein in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this disclosure, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference herein in its entirety.

According to yet another aspect of the disclosure, the polymerization reactor may comprise a solution polymerization reactor wherein the monomer is contacted with the catalyst composition by suitable stirring or other means. A carrier comprising an inert organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present disclosure may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide resin properties include temperature, pressure, and the concentrations of various reactants. Polymerization temperature can affect catalyst productivity, polymer molecular weight and molecular weight distribution. Suitable polymerization temperature may be any temperature below the de-polymerization temperature according to the Gibbs free energy equation. Typically, this includes from about 60° C. to about 280° C., for example, and from about 70° C. to about 110° C., depending upon the type of polymerization reactor.

Suitable pressures will also vary according to the reactor and polymerization type. The pressure for liquid phase polymerizations in a loop reactor is typically less than about 1000 psig. Pressure for gas phase polymerization is usually at about 200 to about 500 psig. In an aspect of the present disclosure a LPEP of the type disclosed herein is produced at a pressure of less than about 15,000 psig, alternatively less than about 10,000 psig, or alternatively less than about 5,000 psig. In an aspect, the reaction is carried out in a solution reactor at pressures ranging from about 400 psig to about 3000 psig or alternatively from about 450 psig to about 2000 psig.

The concentration of various reactants can be controlled to produce resins with certain physical and mechanical properties. The proposed end-use product that will be formed by the resin and the method of forming that product determines the desired resin properties. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching and rheological measurements.

The concentrations of monomer, hydrogen, modifiers, and electron donors may be utilized in producing these resin properties. Co-monomer is used to control product density. Hydrogen can be used to control product molecular weight. Modifiers can be used to control product properties and electron donors affect stereoregularity. In addition, the concentration of poisons is minimized because poisons impact the reactions and product properties. In an aspect, hydrogen is added to the reactor during polymerization and is present in amounts ranging from about 0 ppm to about 1,000 ppm, alternatively from about 0 ppm to about 450 ppm, or alternatively from about 0 ppm to about 300 ppm.

The polymer or resin may be formed into various articles, including, but not limited to pipes, bottles, toys, containers, utensils, film products, drums, tanks, membranes, and liners. Various processes may be used to form these articles, including, but not limited to, film blowing and cast film, blow molding, extrusion molding, rotational molding, injection molding, fiber spinning, thermoforming, cast molding, and the like. After polymerization, additives and modifiers can be added to the polymer to provide better processing during manufacturing and for desired properties in the end product. Additives include surface modifiers such as slip agents, antiblocks, tackifiers; antioxidants such as primary and secondary antioxidants; pigments; processing aids such as waxes/oils and fluoroelastomers; and special additives such as fire retardants, antistats, scavengers, absorbers, odor enhancers, and degradation agents.

The LPEP and compositions of same may include other suitable additives. Examples of additives include, but are not limited to, antistatic agents, colorants, stabilizers, nucleators, surface modifiers, pigments, slip agents, antiblocks, tackafiers, polymer processing aids and combinations thereof. In an aspect, the PE polymer comprises carbon black. Such additives may be used singularly or in combination and may be included in the polymer composition before, during or after preparation of the LPEP as described herein. In an aspect, the compositions disclosed herein comprise less than about 1 weight percent of nonpolymeric additives. Such additives may be added via any suitable technique, for example during an extrusion or compounding step such as during pelletization or subsequent processing into an end use article. Herein the disclosure will refer to a LPEP although a polymer composition comprising the LPEP and one or more additives is also contemplated.

In an aspect, a catalyst composition for the production of a LPEP includes at least two metallocenes (i.e., a dual-metallocene catalyst composition) that are selected such that the polymers produced therefrom have two distinctly different molecular weights (e.g., a multimodal polymer of the type disclosed in more detail herein). In an aspect, the first metallocene may be used to produce the HMW component, and may be a tightly-bridged metallocene containing a substituent that includes a terminal olefin. The second metallocene, that may be used to produce the LMW component, is generally not bridged and is more responsive to chain termination reagents, such as hydrogen, than the first metallocene.

In an alternative aspect, a catalyst composition for the production of an LPEP comprises two bridged metallocenes. For example, a catalyst composition may comprise the metallocene of Formula A and the metallocene of Formula B which produce the HMW component and LMW component respectively.

Formula A

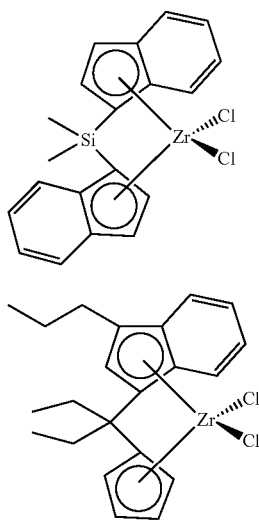

Formula B

The metallocenes may be combined with an activator, an aluminum alkyl compound, an olefin monomer, and an optional olefin comonomer to produce the desired polyolefin. The activity and the productivity of the catalyst may be relatively high. As used herein, the activity refers to the grams of polymer produced per gram of solid catalyst charged per hour, and the productivity refers to the grams of polymer produced per gram of solid catalyst charged. Such catalysts are disclosed for example in U.S. Pat. Nos. 7,312,283 and 7,226,886 each of which is incorporated herein by reference in its entirety.

In an aspect, a catalyst composition for preparation of an LPEP comprises a first metallocene compound, a second metallocene compound, an activator and optionally a co-catalyst. The first metallocene compound may be characterized by the general formula:

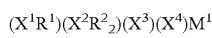

wherein $(X^1)$ is cyclopentadienyl, indenyl, or fluorenyl, $(X^2)$ is fluorenyl, and $(X^1)$ and $(X^2)$ are connected by a disubstituted bridging group comprising one atom bonded to both $(X^1)$ and $(X^2)$, wherein the atom is carbon or silicon. A first substituent of the disubstituted bridging group is an aromatic or aliphatic group having from 1 to about 20 carbon atoms. A second substituent of the disubstituted bridging group can be an aromatic or aliphatic group having from 1 to about 20 carbon atoms, or the second substituent of the disubstituted bridging group is an unsaturated aliphatic group having from 3 to about 10 carbon atoms. $R^1$ is H, or an unsaturated aliphatic group having from 3 to about 10 carbon atoms. $R^2$ is H, an alkyl group having from 1 to about 12 carbon atoms, or an aryl group; $(X^3)$ and $(X^4)$ are independently an aliphatic group, an aromatic group, a cyclic group, a combination of aliphatic and cyclic groups, or a substituted derivative thereof, having from 1 to about 20 carbon atoms, or a halide; and $M^1$ is Zr or Hf. The first substituent of the disubstituted bridging group may be a phenyl group. The second substituent of the disubstituted bridging group may be a phenyl group, an alkyl group, a butenyl group, a pentenyl group, or a hexenyl group.

The second metallocene compound may be characterized by the general formula:

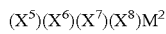

wherein $(X^5)$ and $(X^6)$ are independently a cyclopentadienyl, indenyl, substituted cyclopentadienyl or a substituted indenyl, each substituent on $(X^5)$ and $(X^6)$ is independently selected from a linear or branched alkyl group, or a linear or branched alkenyl group, wherein the alkyl group or alkenyl group is unsubstituted or substituted, any substituent on $(X^5)$ and $(X^6)$ having from 1 to about 20 carbon atoms; $(X^7)$ and $(X^8)$ are independently an aliphatic group, an aromatic group, a cyclic group, a combination of aliphatic and cyclic groups, or a substituted derivative thereof, having from 1 to about 20 carbon atoms; or a halide, and $M^2$ is Zr or Hf. In an alternative aspect, the second metallocene may be a bridged metallocene of the type disclosed herein.

In an aspect of the present disclosure, the ratio of the first metallocene compound to the second metallocene compound may be from about 1:10 to about 10:1. According to other aspects of the present disclosure, the ratio of the first metallocene compound to the second metallocene compound may be from about 1:5 to about 5:1. According to yet other aspects of the present disclosure, the ratio of the first metallocene compound to the second metallocene compound may be from about 1:3 to about 3:1.

In an aspect, a catalyst composition for preparation of an LPEP further comprises a chemically-treated solid oxide which may function as an activator-support. Alternatively, the chemically-treated solid oxide can comprise a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, or any combination thereof.

Generally, chemically-treated solid oxides exhibit enhanced acidity as compared to the corresponding untreated solid oxide compound. The chemically-treated solid oxide also functions as a catalyst activator as compared to the corresponding untreated solid oxide. While the chemically-treated solid oxide activates the transition-metal salt complex in the absence of co-catalysts, co-catalysts may also be included in the catalyst composition. The activation function of the activator-support is evident in the enhanced activity of catalyst composition as a whole, as compared to a catalyst composition containing the corresponding untreated solid oxide. However, it is believed that the chemically-treated solid oxide can function as an activator, even in the absence of an organoaluminum compound, aluminoxanes, organoboron or organoborate compounds, ionizing ionic compounds, and the like.

The chemically-treated solid oxide can comprise a solid oxide treated with an electron-withdrawing anion. While not intending to be bound by the following statement, it is believed that treatment of the solid oxide with an electron-withdrawing component augments or enhances the acidity of the oxide. Thus, either the activator-support exhibits Lewis or Brønsted acidity that is typically greater than the Lewis or Brønsted acid strength of the untreated solid oxide, or the activator-support has a greater number of acid sites than the untreated solid oxide, or both. One method to quantify the acidity of the chemically-treated and untreated solid oxide materials is by comparing the polymerization activities of the treated and untreated oxides under acid catalyzed reactions.

Chemically-treated solid oxides of this disclosure are formed generally from an inorganic solid oxide that exhibits Lewis acidic or Brønsted acidic behavior and has a relatively high porosity. The solid oxide is chemically-treated with an electron-withdrawing component, typically an electron-withdrawing anion, to form an activator-support.

According to one aspect of the present disclosure, the solid oxide used to prepare the chemically-treated solid oxide has a pore volume greater than about 0.1 cc/g. According to another aspect of the present disclosure, the solid oxide has a pore volume greater than about 0.5 cc/g. According to yet another aspect of the present disclosure, the solid oxide has a pore volume greater than about 1.0 cc/g.

In another aspect, the solid oxide has a surface area of from about 100 $m^2/g$ to about 1000 $m^2/g$. In yet another aspect, the solid oxide has a surface area of from about 200 $m^2/g$ to about 800 $m^2/g$. In still another aspect of the present disclosure, the solid oxide has a surface area of from about 250 $m^2/g$ to about 600 $m^2/g$.

The chemically-treated solid oxide can comprise a solid inorganic oxide comprising oxygen and one or more elements selected from Group 2, 3, 4, 5, 6, 7, 8, 9, 10, 11, 12, 13, 14, or 15 of the periodic table, or comprising oxygen and one or more elements selected from the lanthanide or actinide elements (See: Hawley's Condensed Chemical Dictionary, 11th Ed., John Wiley & Sons, 1995; Cotton, F. A., Wilkinson, G., Murillo, C. A., and Bochmann, M., Advanced Inorganic Chemistry, 6th Ed., Wiley-Interscience, 1999). For example, the inorganic oxide can comprise oxygen and an element, or elements, selected from Al, B, Be, Bi, Cd, Co, Cr, Cu, Fe, Ga, La, Mn, Mo, Ni, Sb, Si, Sn, Sr, Th, Ti, V, W, P, Y, Zn, and Zr.

Suitable examples of solid oxide materials or compounds that can be used to form the chemically-treated solid oxide include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$, and the like, including mixed oxides thereof, and combinations thereof. For example, the solid oxide can comprise silica, alumina, silica-alumina, silica-coated alumina, aluminum phosphate, aluminophosphate, heteropolytungstate, titania, zirconia, magnesia, boria, zinc oxide, mixed oxides thereof, or any combination thereof.

The solid oxide of this disclosure encompasses oxide materials such as alumina, "mixed oxide" compounds thereof such as silica-alumina, and combinations and mixtures thereof. The mixed oxide compounds such as silica-alumina can be single or multiple chemical phases with more than one metal combined with oxygen to form a solid oxide compound. Examples of mixed oxides that can be used in the activator-support of the present disclosure include, but are not limited to, silica-alumina, silica-titania, silica-zirconia, zeolites, various clay minerals, alumina-titania, alumina-zirconia, zinc-aluminate, alumina-boria, silica-boria, aluminophosphate-silica, titania-zirconia, and the like. The solid oxide of this disclosure also encompasses oxide materials such as silica-coated alumina, as described in U.S. Pat. No. 7,884,163, the disclosure of which is incorporated herein by reference in its entirety.

The electron-withdrawing component used to treat the solid oxide can be any component that increases the Lewis or Brønsted acidity of the solid oxide upon treatment (as compared to the solid oxide that is not treated with at least one electron-withdrawing anion). According to one aspect of the present disclosure, the electron-withdrawing component is an electron-withdrawing anion derived from a salt, an acid, or other compound, such as a volatile organic compound, that serves as a source or precursor for that anion. Examples of electron-withdrawing anions include, but are not limited to, sulfate, bisulfate, fluoride, chloride, bromide, iodide, fluorosulfate, fluoroborate, phosphate, fluorophosphate, trifluoroacetate, triflate, fluorozirconate, fluorotitanate, phospho-tungstate, and the like, including mixtures and combinations thereof. In addition, other ionic or non-ionic compounds that serve as sources for these electron-withdrawing anions also can be employed in the present disclosure. It is contemplated that the electron-withdrawing anion can be, or can comprise, fluoride, chloride, bromide, phosphate, triflate, bisulfate, or sulfate, and the like, or any combination thereof, in some aspects of this disclosure. In other aspects, the electron-withdrawing anion can comprise sulfate, bisulfate, fluoride, chloride, bromide, iodide, fluorosulfate, fluoroborate, phosphate, fluorophosphate, trifluoroacetate, triflate, fluorozirconate, fluorotitanate, and the like, or any combination thereof.

Thus, for example, the activator-support (e.g., chemically-treated solid oxide) used in the catalyst compositions can be, or can comprise, fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, and the like, or combinations thereof. In one aspect, the activator-support can be, or can comprise, fluorided alumina, sulfated alumina, fluorided silica-alumina, sulfated silica-alumina, fluorided silica-coated alumina, sulfated silica-coated alumina, phosphated silica-coated alumina, and the like, or any combination thereof. In another aspect, the activator-support comprises fluorided alumina; alternatively, comprises chlorided alumina; alternatively, comprises sulfated alumina; alternatively, comprises fluorided silica-alumina; alternatively, comprises sulfated silica-alumina; alternatively, comprises fluorided silica-zirconia;

alternatively, comprises chlorided silica-zirconia; or alternatively, comprises fluorided silica-coated alumina.

When the electron-withdrawing component comprises a salt of an electron-withdrawing anion, the counterion or cation of that salt can be selected from any cation that allows the salt to revert or decompose back to the acid during calcining. Factors that dictate the suitability of the particular salt to serve as a source for the electron-withdrawing anion include, but are not limited to, the solubility of the salt in the desired solvent, the lack of adverse reactivity of the cation, ion-pairing effects between the cation and anion, hygroscopic properties imparted to the salt by the cation, and the like, and thermal stability of the anion. Examples of suitable cations in the salt of the electron-withdrawing anion include, but are not limited to, ammonium, trialkyl ammonium, tetraalkyl ammonium, tetraalkyl phosphonium, $H^+$, $[H(OEt_2)_2]^+$, and the like.

Further, combinations of one or more different electron-withdrawing anions, in varying proportions, can be used to tailor the specific acidity of the activator-support to the desired level. Combinations of electron-withdrawing components can be contacted with the oxide material simultaneously or individually, and in any order that affords the desired chemically-treated solid oxide acidity. For example, one aspect of this disclosure is employing two or more electron-withdrawing anion source compounds in two or more separate contacting steps.

Thus, one example of such a process by which a chemically-treated solid oxide is prepared is as follows: a selected solid oxide, or combination of solid oxides, is contacted with a first electron-withdrawing anion source compound to form a first mixture; this first mixture is calcined and then contacted with a second electron-withdrawing anion source compound to form a second mixture; the second mixture is then calcined to form a treated solid oxide. In such a process, the first and second electron-withdrawing anion source compounds can be either the same or different compounds.

According to another aspect of the present disclosure, the chemically-treated solid oxide comprises a solid inorganic oxide material, a mixed oxide material, or a combination of inorganic oxide materials, that is chemically-treated with an electron-withdrawing component, and optionally treated with a metal source, including metal salts, metal ions, or other metal-containing compounds. Nonlimiting examples of the metal or metal ion include zinc, nickel, vanadium, titanium, silver, copper, gallium, tin, tungsten, molybdenum, zirconium, and the like, or combinations thereof. Examples of chemically-treated solid oxides that contain a metal or metal ion include, but are not limited to, chlorided zinc-impregnated alumina, fluorided titanium-impregnated alumina, fluorided zinc-impregnated alumina, chlorided zinc-impregnated silica-alumina, fluorided zinc-impregnated silica-alumina, sulfated zinc-impregnated alumina, chlorided zinc aluminate, fluorided zinc aluminate, sulfated zinc aluminate, silica-coated alumina treated with hexafluorotitanic acid, silica-coated alumina treated with zinc and then fluorided, and the like, or any combination thereof.

Any method of impregnating the solid oxide material with a metal can be used. The method by which the oxide is contacted with a metal source, typically a salt or metal-containing compound, can include, but is not limited to, gelling, co-gelling, impregnation of one compound onto another, and the like. If desired, the metal-containing compound is added to or impregnated into the solid oxide in solution form, and subsequently converted into the supported metal upon calcining. Accordingly, the solid inorganic oxide can further comprise a metal selected from zinc, titanium, nickel, vanadium, silver, copper, gallium, tin, tungsten, molybdenum, and the like, or combinations of these metals. For example, zinc is often used to impregnate the solid oxide because it can provide improved catalyst activity at a low cost.

The solid oxide can be treated with metal salts or metal-containing compounds before, after, or at the same time that the solid oxide is treated with the electron-withdrawing anion. Following any contacting method, the contacted mixture of solid compound, electron-withdrawing anion, and the metal ion is typically calcined. Alternatively, a solid oxide material, an electron-withdrawing anion source, and the metal salt or metal-containing compound are contacted and calcined simultaneously.

Various processes are used to form the chemically-treated solid oxide useful in the present disclosure. The chemically-treated solid oxide can comprise the contact product of one or more solid oxides with one or more electron-withdrawing anion sources. It is not required that the solid oxide be calcined prior to contacting the electron-withdrawing anion source. The contact product typically is calcined either during or after the solid oxide is contacted with the electron-withdrawing anion source. The solid oxide can be calcined or uncalcined. Various processes to prepare solid oxide activator-supports that can be employed in this disclosure have been reported. For example, such methods are described in U.S. Pat. Nos. 6,107,230; 6,165,929; 6,294,494; 6,300,271; 6,316,553; 6,355,594; 6,376,415; 6,388,017; 6,391,816; 6,395,666; 6,524,987; 6,548,441; 6,548,442; 6,576,583; 6,613,712; 6,632,894; 6,667,274; and 6,750,302; the disclosures of which are incorporated herein by reference in their entirety.

According to one aspect of the present disclosure, the solid oxide material is chemically-treated by contacting it with an electron-withdrawing component, typically an electron-withdrawing anion source. Further, the solid oxide material optionally is chemically treated with a metal ion, and then calcined to form a metal-containing or metal-impregnated chemically-treated solid oxide. According to another aspect of the present disclosure, the solid oxide material and electron-withdrawing anion source are contacted and calcined simultaneously.

The method by which the oxide is contacted with the electron-withdrawing component, typically a salt or an acid of an electron-withdrawing anion, can include, but is not limited to, gelling, co-gelling, impregnation of one compound onto another, and the like. Thus, following any contacting method, the contacted mixture of the solid oxide, electron-withdrawing anion, and optional metal ion, is calcined.

The solid oxide activator-support (i.e., chemically-treated solid oxide) thus can be produced by a process comprising:

1) contacting a solid oxide (or solid oxides) with an electron-withdrawing anion source compound (or compounds) to form a first mixture; and 2) calcining the first mixture to form the solid oxide activator-support.

According to another aspect of the present disclosure, the solid oxide activator-support (chemically-treated solid oxide) is produced by a process comprising:

1) contacting a solid oxide (or solid oxides) with a first electron-withdrawing anion source compound to form a first mixture;

2) calcining the first mixture to produce a calcined first mixture;

3) contacting the calcined first mixture with a second electron-withdrawing anion source compound to form a second mixture; and 4) calcining the second mixture to form the solid oxide activator-support.

According to yet another aspect of the present disclosure, the chemically-treated solid oxide is produced or formed by contacting the solid oxide with the electron-withdrawing anion source compound, where the solid oxide compound is calcined before, during, or after contacting the electron-withdrawing anion source, and where there is a substantial absence of aluminoxanes, organoboron or organoborate compounds, and ionizing ionic compounds.

Calcining of the treated solid oxide generally is conducted in an ambient atmosphere, typically in a dry ambient atmosphere, at a temperature from about 200° C. to about 900° C., and for a time of about 1 minute to about 100 hours. Calcining can be conducted at a temperature of from about 300° C. to about 800° C., or alternatively, at a temperature of from about 400° C. to about 700° C. Calcining can be conducted for about 30 minutes to about 50 hours, or for about 1 hour to about 15 hours. Thus, for example, calcining can be carried out for about 1 to about 10 hours at a temperature of from about 350° C. to about 550° C. Any suitable ambient atmosphere can be employed during calcining. Generally, calcining is conducted in an oxidizing atmosphere, such as air. Alternatively, an inert atmosphere, such as nitrogen or argon, or a reducing atmosphere, such as hydrogen or carbon monoxide, can be used.

According to one aspect of the present disclosure, the solid oxide material is treated with a source of halide ion, sulfate ion, or a combination of anions, optionally treated with a metal ion, and then calcined to provide the chemically-treated solid oxide in the form of a particulate solid. For example, the solid oxide material can be treated with a source of sulfate (termed a "sulfating agent"), a source of chloride ion (termed a "chloriding agent"), a source of fluoride ion (termed a "fluoriding agent"), or a combination thereof, and calcined to provide the solid oxide activator. Useful acidic activator-supports include, but are not limited to, bromided alumina, chlorided alumina, fluorided alumina, sulfated alumina, bromided silica-alumina, chlorided silica-alumina, fluorided silica-alumina, sulfated silica-alumina, bromided silica-zirconia, chlorided silica-zirconia, fluorided silica-zirconia, sulfated silica-zirconia, fluorided silica-titania, alumina treated with hexafluorotitanic acid, silica-coated alumina treated with hexafluorotitanic acid, silica-alumina treated with hexafluorozirconic acid, silica-alumina treated with trifluoroacetic acid, fluorided boria-alumina, silica treated with tetrafluoroboric acid, alumina treated with tetrafluoroboric acid, alumina treated with hexafluorophosphoric acid, a pillared clay, such as a pillared montmorillonite, optionally treated with fluoride, chloride, or sulfate; phosphated alumina or other aluminophosphates optionally treated with sulfate, fluoride, or chloride; or any combination of the above. Further, any of these activator-supports optionally can be treated with a metal ion.

The chemically-treated solid oxide can comprise a fluorided solid oxide in the form of a particulate solid. The fluorided solid oxide can be formed by contacting a solid oxide with a fluoriding agent. The fluoride ion can be added to the oxide by forming a slurry of the oxide in a suitable solvent such as alcohol or water including, but not limited to, the one to three carbon alcohols because of their volatility and low surface tension. Examples of suitable fluoriding agents include, but are not limited to, hydrofluoric acid (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid (($NH_4)_2TiF_6$), hexafluorozirconic acid ($H_2ZrF_6$), $AlF_3$, $NH_4AlF_4$, analogs thereof, and combinations thereof. Triflic acid and ammonium triflate also can be employed. For example, ammonium bifluoride ($NH_4HF_2$) can be used as the fluoriding agent, due to its ease of use and availability.

If desired, the solid oxide is treated with a fluoriding agent during the calcining step. Any fluoriding agent capable of thoroughly contacting the solid oxide during the calcining step can be used. For example, in addition to those fluoriding agents described previously, volatile organic fluoriding agents can be used. Examples of volatile organic fluoriding agents useful in this aspect of the disclosure include, but are not limited to, freons, perfluorohexane, perfluorobenzene, fluoromethane, trifluoroethanol, and the like, and combinations thereof. Calcining temperatures generally must be high enough to decompose the compound and release fluoride. Gaseous hydrogen fluoride (HF) or fluorine ($F_2$) itself also can be used with the solid oxide if fluorided while calcining. Silicon tetrafluoride ($SiF_4$) and compounds containing tetrafluoroborate ($BF_4^-$) also can be employed. One convenient method of contacting the solid oxide with the fluoriding agent is to vaporize a fluoriding agent into a gas stream used to fluidize the solid oxide during calcination.

Similarly, in another aspect of this disclosure, the chemically-treated solid oxide comprises a chlorided solid oxide in the form of a particulate solid. The chlorided solid oxide is formed by contacting a solid oxide with a chloriding agent. The chloride ion can be added to the oxide by forming a slurry of the oxide in a suitable solvent. The solid oxide can be treated with a chloriding agent during the calcining step. Any chloriding agent capable of serving as a source of chloride and thoroughly contacting the oxide during the calcining step can be used, such as $SiCl_4$, $SiMe_2Cl_2$, $TiCl_4$, $BCl_3$, and the like, including mixtures thereof. Volatile organic chloriding agents can be used. Examples of suitable volatile organic chloriding agents include, but are not limited to, certain freons, perchlorobenzene, chloromethane, dichloromethane, chloroform, carbon tetrachloride, trichloroethanol, and the like, or any combination thereof. Gaseous hydrogen chloride or chlorine itself also can be used with the solid oxide during calcining. One convenient method of contacting the oxide with the chloriding agent is to vaporize a chloriding agent into a gas stream used to fluidize the solid oxide during calcination.

The amount of fluoride or chloride ion present before calcining the solid oxide generally is from about 1 to about 50% by weight, where the weight percent is based on the weight of the solid oxide, for example, silica-alumina, before calcining. According to another aspect of this disclosure, the amount of fluoride or chloride ion present before calcining the solid oxide is from about 1 to about 25% by weight, and according to another aspect of this disclosure, from about 2 to about 20% by weight. According to yet another aspect of this disclosure, the amount of fluoride or chloride ion present before calcining the solid oxide is from about 4 to about 10% by weight. Once impregnated with halide, the halided oxide can be dried by any suitable method including, but not limited to, suction filtration followed by evaporation, drying under vacuum, spray drying, and the like, although it is also possible to initiate the calcining step immediately without drying the impregnated solid oxide.

The silica-alumina used to prepare the treated silica-alumina typically has a pore volume greater than about 0.5 cc/g. According to one aspect of the present disclosure, the pore volume is greater than about 0.8 cc/g, and according to another aspect of the present disclosure, greater than about 1.0 cc/g. Further, the silica-alumina generally has a surface area greater than about 100 m$^2$/g. According to another aspect of this disclosure, the surface area is greater than about 250 m$^2$/g. Yet, in another aspect, the surface area is greater than about 350 m$^2$/g.

A silica-alumina suitable for use in the present disclosure typically has an alumina content from about 5 to about 95% by weight. According to one aspect of this disclosure, the alumina content of the silica-alumina is from about 5 to about 50%, or from about 8% to about 30%, alumina by weight. In another aspect, high alumina content silica-alumina compounds can employed, in which the alumina content of these silica-alumina compounds typically ranges from about 60% to about 90%, or from about 65% to about 80%, alumina by weight. According to yet another aspect of this disclosure, the solid oxide component comprises alumina without silica, and according to another aspect of this disclosure, the solid oxide component comprises silica without alumina.

The sulfated solid oxide comprises sulfate and a solid oxide component, such as alumina or silica-alumina, in the form of a particulate solid. Optionally, the sulfated oxide is treated further with a metal ion such that the calcined sulfated oxide comprises a metal. According to one aspect of the present disclosure, the sulfated solid oxide comprises sulfate and alumina. In some instances, the sulfated alumina is formed by a process wherein the alumina is treated with a sulfate source, for example, sulfuric acid or a sulfate salt such as ammonium sulfate. This process is generally performed by forming a slurry of the alumina in a suitable solvent, such as alcohol or water, in which the desired concentration of the sulfating agent has been added. Suitable organic solvents include, but are not limited to, the one to three carbon alcohols because of their volatility and low surface tension.

According to one aspect of this disclosure, the amount of sulfate ion present before calcining is from about 0.5 to about 100 parts by weight sulfate ion to about 100 parts by weight solid oxide. According to another aspect of this disclosure, the amount of sulfate ion present before calcining is from about 1 to about 50 parts by weight sulfate ion to about 100 parts by weight solid oxide, and according to still another aspect of this disclosure, from about 5 to about 30 parts by weight sulfate ion to about 100 parts by weight solid oxide. These weight ratios are based on the weight of the solid oxide before calcining. Once impregnated with sulfate, the sulfated oxide can be dried by any suitable method including, but not limited to, suction filtration followed by evaporation, drying under vacuum, spray drying, and the like, although it is also possible to initiate the calcining step immediately.

According to another aspect of the present disclosure, the activator-support used in preparing the catalyst compositions of this disclosure comprises an ion-exchangeable activator-support, including but not limited to silicate and aluminosilicate compounds or minerals, either with layered or non-layered structures, and combinations thereof. In another aspect of this disclosure, ion-exchangeable, layered aluminosilicates such as pillared clays are used as activator-supports. When the acidic activator-support comprises an ion-exchangeable activator-support, it can optionally be treated with at least one electron-withdrawing anion such as those disclosed herein, though typically the ion-exchangeable activator-support is not treated with an electron-withdrawing anion.

According to another aspect of the present disclosure, the activator-support of this disclosure comprises clay minerals having exchangeable cations and layers capable of expanding. Typical clay mineral activator-supports include, but are not limited to, ion-exchangeable, layered aluminosilicates such as pillared clays. Although the term "support" is used, it is not meant to be construed as an inert component of the catalyst composition, but rather is to be considered an active part of the catalyst composition, because of its intimate association with the transition-metal salt complex component.

According to another aspect of the present disclosure, the clay materials of this disclosure encompass materials either in their natural state or that have been treated with various ions by wetting, ion exchange, or pillaring. Typically, the clay material activator-support of this disclosure comprises clays that have been ion exchanged with large cations, including polynuclear, highly charged metal complex cations. However, the clay material activator-supports of this disclosure also encompass clays that have been ion exchanged with simple salts, including, but not limited to, salts of Al(III), Fe(II), Fe(III), and Zn(II) with ligands such as halide, acetate, sulfate, nitrate, or nitrite.

According to another aspect of the present disclosure, the activator-support comprises a pillared clay. The term "pillared clay" is used to refer to clay materials that have been ion exchanged with large, typically polynuclear, highly charged metal complex cations. Examples of such ions include, but are not limited to, Keggin ions which can have charges such as 7$^+$, various polyoxometallates, and other large ions. Thus, the term pillaring refers to a simple exchange reaction in which the exchangeable cations of a clay material are replaced with large, highly charged ions, such as Keggin ions. These polymeric cations are then immobilized within the interlayers of the clay and when calcined are converted to metal oxide "pillars," effectively supporting the clay layers as column-like structures. Thus, once the clay is dried and calcined to produce the supporting pillars between clay layers, the expanded lattice structure is maintained and the porosity is enhanced. The resulting pores can vary in shape and size as a function of the pillaring material and the parent clay material used. Examples of pillaring and pillared clays are found in: T. J. Pinnavaia, Science 220 (4595), 365-371 (1983); J. M. Thomas, Intercalation Chemistry, (S. Whittington and A. Jacobson, eds.) Ch. 3, pp. 55-99, Academic Press, Inc., (1972); U.S. Pat. Nos. 4,452,910; 5,376,611; and 4,060,480; the disclosures of which are incorporated herein by reference in their entirety.

The pillaring process utilizes clay minerals having exchangeable cations and layers capable of expanding. Any pillared clay that can enhance the polymerization of olefins in the catalyst composition of the present disclosure can be used. Therefore, suitable clay minerals for pillaring include, but are not limited to, allophanes; smectites, both dioctahedral (Al) and tri-octahedral (Mg) and derivatives thereof such as montmorillonites (bentonites), nontronites, hectorites, or laponites; halloysites; vermiculites; micas; fluoromicas; chlorites; mixed-layer clays; the fibrous clays including but not limited to sepiolites, attapulgites, and palygorskites; a serpentine clay; illite; laponite; saponite; and any combination thereof. In one aspect, the pillared clay activator-support comprises bentonite or montmorillonite. The principal component of bentonite is montmorillonite.

The pillared clay can be pretreated if desired. For example, a pillared bentonite is pretreated by drying at about 300° C. under an inert atmosphere, typically dry nitrogen, for about 3 hours, before being added to the polymerization reactor. Although an exemplary pretreatment is described herein, it should be understood that the preheating can be carried out at many other temperatures and times, including any combination of temperature and time steps, all of which are encompassed by this disclosure.

The activator-support used to prepare the catalyst compositions of the present disclosure can be combined with other inorganic support materials, including, but not limited to, zeolites, inorganic oxides, phosphated inorganic oxides, and the like. In one aspect, typical support materials that are used include, but are not limited to, silica, silica-alumina, alumina, titania, zirconia, magnesia, boria, thoria, aluminophosphate, aluminum phosphate, silica-titania, coprecipitated silica/titania, mixtures thereof, or any combination thereof. In an aspect, the activator-support comprises a sulfated solid oxide activator support (SSA) comprising mullite, SSA-mullite. Mullite (also known as porcelainite) is a silicate mineral of post-clay genesis that has the general chemical formula $(Al_{2+2x}Si_{2-2x}O_{10-x})$ where x=0.25 corresponds a form of mullite termed 3:2 mullite (chemical formula $Al_2O_3 2SiO_2$); and x=0.4 corresponds to a form of mullite termed 2:1 mullite (chemical formula $2Al_2O_3 SiO_2$). Mullite is a solid solution phase of alumina and silica and is the only stable intermediate phase of the material at atmospheric pressure. The X-ray diffraction pattern of mullite depicts the material as comprising chains of distorted edge-sharing Al—O octahedra at the corners and center of each unit cell funning parallel to the c-axis. The chains are cross-linked by Si-A and Al—O corner sharing tetrahedra.

The process of making these activator-supports may include precipitation, co-precipitation, impregnation, gelation, pore-gelation, calcining (at up to 900° C.), spray-drying, flash-drying, rotary drying and calcining, milling, sieving, and similar operations.

In an aspect, the LPEP optionally comprises a metal alkyl or a metalloid alkyl which may function as a cocatalyst. Generally, the metal alkyl compound which can be utilized in the catalyst system of this disclosure can be any heteroleptic or homoleptic metal alkyl compound. In an aspect, the metal alkyl can comprise, consist essentially of, or consist of, a non-halide metal alkyl, a metal alkyl halide, or any combination thereof; alternatively, a non-halide metal alkyl; or alternatively, a metal alkyl halide.

In an aspect, the metal of the metal alkyl can comprise, consist essentially of, or consist of, a group 1, 2, 11, 12, 13, or 14 metal; or alternatively, a group 13 or 14 metal; or alternatively, a group 13 metal. In some aspects, the metal of the metal alkyl (non-halide metal alkyl or metal alkyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium, calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal alkyl (non-halide metal alkyl or metal alkyl halide) can comprise, consist essentially of, or consist of, a lithium alkyl, a sodium alkyl, a magnesium alkyl, a boron alkyl, a zinc alkyl, or an aluminum alkyl. In some aspects, the metal alkyl (non-halide metal alkyl or metal alkyl halide) can comprise, consist essentially of, or consist of, an aluminum alkyl.

In an aspect, the aluminum alkyl can be a trialkylaluminum, an alkylaluminum halide, an alkylaluminum alkoxide, an aluminoxane, or any combination thereof. In some aspects, the aluminum alkyl can be a trialkylaluminum, an alkylaluminum halide, an aluminoxane, or any combination thereof; or alternatively, a trialkylaluminum, an aluminoxane, or any combination thereof. In other aspects, the aluminum alkyl can be a trialkylaluminum; alternatively, an alkylaluminum halide; alternatively, an alkylaluminum alkoxide; or alternatively, an aluminoxane.

In a non-limiting aspect, the aluminoxane can have a repeating unit characterized by the Formula I:

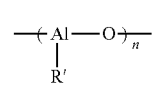

Formula I wherein R' is a linear or branched alkyl group. Alkyl groups for metal alkyls have been independently described herein and can be utilized without limitation to further describe the aluminoxanes having Formula I. Generally, n of Formula I is greater than 1; or alternatively, greater than 2. In an aspect, n can range from 2 to 15; or alternatively, range from 3 to 10.

In an aspect, each halide of any metal alkyl halide disclosed herein can independently be fluoride, chloride, bromide, or iodide; alternatively, chloride, bromide, or iodide. In an aspect, each halide of any metal alkyl halide disclosed herein can be fluoride; alternatively, chloride; alternatively, bromide; or alternatively, iodide.

In an aspect, the alkyl group of any metal alkyl disclosed herein (non-halide metal alkyl or metal alkyl halide) can each independently be a $C_1$ to $C_{20}$ alkyl group; alternatively, a $C_1$ to $C_{10}$ alkyl group; or alternatively, a $C_1$ to $C_6$ alkyl group. In an aspect, the alkyl group(s) can each independently be a methyl group, an ethyl group, a propyl group, a butyl group, a pentyl group, a hexyl group, a heptyl group, or an octyl group; alternatively, a methyl group, a ethyl group, a butyl group, a hexyl group, or an octyl group. In some aspects, the alkyl group can each independently be a methyl group, an ethyl group, an n-propyl group, an n-butyl group, an iso-butyl group, an n-hexyl group, or an n-octyl group; alternatively, a methyl group, an ethyl group, an n-butyl group, or an iso-butyl group; alternatively, a methyl group; alternatively, an ethyl group; alternatively, an n-propyl group; alternatively, an n-butyl group; alternatively, an iso-butyl group; alternatively, an n-hexyl group; or alternatively, an n-octyl group.

In an aspect, the alkoxide group of any metal alkyl alkoxide disclosed herein can each independently be a $C_1$ to $C_{20}$ alkoxy group; alternatively, a $C_1$ to $C_{10}$ alkoxy group; or alternatively, a $C_1$ to $C_6$ alkoxy group. In an aspect, each alkoxide group of any metal alkyl alkoxide disclosed herein can each independently be a methoxy group, an ethoxy group, a propoxy group, a butoxy group, a pentoxy group, a hexoxy group, a heptoxy group, or an octoxy group; alternatively, a methoxy group, a ethoxy group, a butoxy group, a hexoxy group, or an octoxy group. In some aspects, each alkoxide group of any metal alkyl alkoxide disclosed herein can each independently be a methoxy group, an ethoxy group, an n-propoxy group, an n-butoxy group, an iso-butoxy group, an n-hexoxy group, or an n-octoxy group; alternatively, a methoxy group, an ethoxy group, an n-butoxy group, or an iso-butoxy group; alternatively, a methoxy group; alternatively, an ethoxy group; alternatively, an n-propoxy group; alternatively, an n-butoxy group; alternatively, an iso-butoxy group; alternatively, an n-hexoxy group; or alternatively, an n-octoxy group.

In a non-limiting aspect, useful metal alkyls can include methyl lithium, n-butyl lithium, sec-butyl lithium, tert-butyl lithium, diethyl magnesium, di-n-butylmagnesium, ethylmagnesium chloride, n-butylmagnesium chloride, and diethyl zinc.

In a non-limiting aspect, useful trialkylaluminum compounds can include trimethylaluminum, triethylaluminum, tripropylaluminum, tributylaluminum, trihexylaluminum, trioctylaluminum, or mixtures thereof. In some non-limiting aspects, trialkylaluminum compounds can include trimethylaluminum, triethylaluminum, tripropylaluminum, tri-n-butylaluminum, tri-isobutylaluminum (TIBA), trihexylaluminum, tri-n-octylaluminum, or mixtures thereof; alternatively, triethylaluminum, tri-n-butylaluminum, tri-isobutylaluminum, trihexylaluminum, tri-n-octylaluminum, or mixtures thereof; alternatively, triethylaluminum, tri-n-butylaluminum, trihexylaluminum, tri-n-octylaluminum, or mixtures thereof. In other non-limiting aspects, useful trialkylaluminum compounds can include trimethylaluminum; alternatively, triethylaluminum; alternatively, tripropylaluminum; alternatively, tri-n-butylaluminum; alternatively, tri-isobutylaluminum; alternatively, trihexylaluminum; or alternatively, tri-n-octylaluminum.

In a non-limiting aspect, useful alkylaluminum halides can include diethylaluminum chloride, diethylaluminum bromide, ethylaluminum dichloride, ethylaluminum sesquichloride, and mixtures thereof. In some non-limiting aspects, useful alkylaluminum halides can include diethylaluminum chloride, ethylaluminum dichloride, ethylaluminum sesquichloride, and mixtures thereof. In other non-limiting aspects, useful alkylaluminum halides can include diethylaluminum chloride; alternatively, diethylaluminum bromide; alternatively, ethylaluminum dichloride; or alternatively, ethylaluminum sesquichloride.

In a non-limiting aspect, useful aluminoxanes can include methylaluminoxane (MAO), ethylaluminoxane, modified methylaluminoxane (MMAO), n-propylaluminoxane, iso-propylaluminoxane, n-butylaluminoxane, sec-butylaluminoxane, iso-butylaluminoxane, t-butyl aluminoxane, 1-pentylaluminoxane, 2-pentylaluminoxane, 3-pentylaluminoxane, iso-pentylaluminoxane, neopentylaluminoxane, or mixtures thereof; In some non-limiting aspects, useful aluminoxanes can include methylaluminoxane (MAO), modified methylaluminoxane (MMAO), isobutyl aluminoxane, t-butyl aluminoxane, or mixtures thereof. In other non-limiting aspects, useful aluminoxanes can include methylaluminoxane (MAO); alternatively, ethylaluminoxane; alternatively, modified methylaluminoxane (MMAO); alternatively, n-propylaluminoxane; alternatively, iso-propylaluminoxane; alternatively, n-butylaluminoxane; alternatively, sec-butylaluminoxane; alternatively, iso-butylaluminoxane; alternatively, t-butyl aluminoxane; alternatively, 1-pentylaluminoxane; alternatively, 2-pentylaluminoxane; alternatively, 3-pentylaluminoxane; alternatively, iso-pentylaluminoxane; or alternatively, neopentylaluminoxane.

In an aspect, the metal alkyl comprises comprise an organoboron compound or an organoborate compound. Organoboron or organoborate compounds include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present disclosure. Examples of fluoroorgano borate compounds that can be used in the present disclosure include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoro-methyl)phenyl]borate, triphenylcarbenium tetrakis[3,5-bis(trifluoromethyl)phenyl]borate, and the like, or mixtures thereof. Examples of fluoroorgano boron compounds that can be used in the present disclosure include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, are thought to form "weakly-coordinating" anions when combined with organo-metal compounds, as disclosed in U.S. Pat. No. 5,919,983, the disclosure of which is incorporated herein by reference in its entirety. Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

In an aspect, the catalyst composition comprises compounds like those represented by the chemical structures A and B with an SSA as the activator-support (e.g., SSA-mullite) utilizing tri-isobutylaluminum (TIBA) as the co-catalyst.

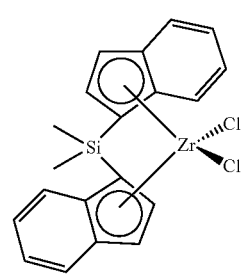

A

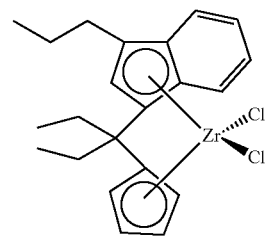

B

A polymer of the type described herein may be a multi-modal resin. Herein, the "modality" of a polymer resin refers to the form of its molecular weight distribution curve, i.e., the appearance of the graph of the polymer weight fraction as a function of its molecular weight, as may be displayed by, for example, gel permeation chromatography (GPC). The polymer weight fraction refers to the weight fraction of molecules of a given size. A polymer having a molecular weight distribution curve showing a single peak may be referred to as a unimodal polymer, a polymer having a curve showing two distinct peaks may be referred to as bimodal or a bimodal-like polymer, a polymer having a curve showing three distinct peaks may be referred to as trimodal polymer, etc. Polymers having molecular weight distribution curves showing more than one peak may be collectively referred to as multimodal polymers or resins. It is acknowledged that, in some instances, a multimodal polymer may appear to have a single peak via, for example, GPC analysis, when in fact the polymer itself is multimodal. In such instances, overlap of peaks may obscure the presence of other peaks and may imply unimodality, when in fact multimodality is a more accurate representation of the nature of the polymer.

In an aspect, the LPEP is characterized as a bimodal resin. A GPC of a polymer of the type described herein (i.e., LPEP) may display the following identifiable features (i) a peak attributable to a higher molecular weight (HMW) component and (ii) a peak attributable to a lower molecular weight (LMW) component. It is to be understood that a LMW component corresponds to a subpopulation of the polymer which on a GPC profile will show a distribution of molecular weights (e.g., Schulz-Flory, Gaussian) centered around some peak maximum value or range that has a lesser numerical value than the HMW component which is another subpopulation of the polymer also characterized by a distribution with a peak maximum value or range. In an aspect, a GPC plot of the polymer exhibits a LMW component that is baseline separated from the HMW component. In an alternative aspect, a GPC plot of the polymer exhibits a LMW component that is not baseline separated from the HMW component. In such aspects, the GPC plot may be deconvoluted using any suitable methodology to extract the independent GPC profiles of the LMW and HMW components.

In an aspect, the HMW component is present in a weight percentage based on the total weight of the polymer of from about 5% to about 65%, alternatively from about 5% to about 35% or alternatively from about 10% to about 20% based on the deconvolution of each of the bimodal peaks into separate peaks with the remainder of the polymer primarily being the LMW component. Methodologies for deconvolution of the peaks include commercially available software programs such as AUTOFIT PEAKS III DECONVOLUTION as part of the PEAKFIT program available from Systat Software. Additional description of this methodology may be found for example in an article by Rydholm et al, Macromolecules, 2006, volume 39, issue 23, pages 7882-7880.

In one or more aspects, a polymer of the type described herein (i.e., LPEP) is characterized by a density of greater than about 0.930 g/ml, alternatively greater than about 0.935 g/ml, alternatively greater than about 0.940 g/ml, alternatively from about 0.89 g/cc to about 0.98 g/cc, alternatively from about 0.915 g/cc to about 0.975 g/cc, alternatively from about 0.925 g/cc to about 0.975 g/cc, alternatively from about 0.931 g/cc to about 0.975 g/cc or alternatively from about 0.931 g/cc to about 0.950 g/cc as determined in accordance with ASTM D1505.

An LPEP of the type disclosed herein may be characterized by a weight average molecular weight ($M_w$) of from about 30 kg/mol to about 350 kg/mol, alternatively from about 50 kg/mol to about 200 kg/mol, alternatively from about 60 kg/mol to about 175 kg/mol or alternatively from about 60 kg/mol to about 125 kg/mol. The weight average molecular weight may be calculated according to equation 1:

$$\overline{M}_w = \frac{\sum_i N_i M_i^2}{\sum_i N_i M_i} \quad (1)$$

where $N_i$ is the number of molecules of molecular weight $M_i$.

An LPEP of the type disclosed herein may be characterized by a number average molecular weight ($M_n$) of from about 7 kg/mol to about 75 kg/mol, alternatively from about 7 kg/mol to about 25 kg/mol, or alternatively from about 10 kg/mol to about 17 kg/mol. The number average molecular weight is the common average of the molecular weights of the individual polymers and may be calculated according to equation (2).

$$\overline{M}_n = \frac{\sum_i N_i M_i}{\sum_i N_i} \quad (2)$$

The LPEP may further be characterized by a molecular weight distribution (MWD) of from about 1 to about 50, alternatively from about 2 to about 20, or alternatively from about 4 to about 8. The MWD refers to the ratio of the $M_w$ to the $M_n$, which is also termed the polydispersity index (PDI) or more simply polydispersity.

In an aspect, a polymer of the type described herein (i.e., LPEP) has a melt index, MI, of from about 0 g/10 min. to about 50 g/10 min., alternatively from about 1 g/10 min. to about 50 g/10 min., alternatively from about 10 g/10 min. to about 50 g/min., or alternatively from about 12 g/10 min. to about 30 g/10 min. The melt index (MI) refers to the amount of a polymer which can be forced through an extrusion rheometer orifice of 0.0825 inch diameter when subjected to a force of 2160 grams in ten minutes at 190° C., as determined in accordance with ASTM D 1238.

The polymers of this disclosure (i.e., LPEP) may be further characterized by their rheological breath. Rheological breadth refers to the breadth of the transition region between Newtonian and power-law type shear rate for a polymer or the frequency dependence of the viscosity of the polymer. The rheological breadth is a function of the relaxation time distribution of a polymer which in turn is a function of the polymer molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the equation 3:

$$|\eta^*(\omega)| = \eta_0 [1 + (\tau_\eta \omega)^a]^{(n-1)/a} \quad (3)$$

where $|\eta^*(\omega)|$ is the magnitude of complex shear viscosity; $\eta_0$ is the zero-shear viscosity; $\tau_\eta$ is the viscous relaxation time; a is a breadth parameter; n is a parameter that fixes the final power law slope, which is fixed at 2/11 in this work; and ω is an angular frequency of oscillatory shear deformation.

To facilitate model fitting, the power law constant is held at a constant value. Details of the significance and interpretation of the CY model and derived parameters may be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume 1, Fluid Mechanics,* 2nd Edition, John Wiley & Sons (1987), each of which is incorporated by reference herein in its entirety.

In an aspect, the LPEPs of this disclosure have an "eta at 0" ($\eta_0$) of from about 1.00E+01 to about 9.00E+10; alternatively from about 1.00E+02 to about 5.00E+08, alternatively from about 1.00E+03 to about 3.00E+06, or alternatively from about 1.00E+03 to about 1.00E+05.

In an aspect, the LPEPs of this disclosure have an "eta at 0.3" ($\eta_{100}$) of from about 3.00E+02 Pascal seconds (Pa·s) to about 1.00E+04 Pa·s, alternatively from about 5.00E+02 Pa·s to about 7.00E+03 Pa·s, alternatively from about 1.00E+03 Pa·s to about 2.00E+03 Pa·s, or alternatively from about 1.2 E+03 Pa·s to about 1.8 E+03 Pa·s.

In an aspect, the LPEPs of this disclosure have an "eta at 100" ($\eta_{100}$) of from about 3.00E+03 Pa·s to about 5.00E+04 Pa·s, alternatively from about 7.00E+03 Pa·s to about 3.00E+04 Pa·s, alternatively from about 1.00E+04 Pa·s to about 2.00E+04 Pa·s, or alternatively from about 1.2 E+04 Pa·s to about 1.8 E+04 Pa·s.

In an aspect, the polymers of this disclosure (i.e. LPEP) have an "CY-a" value of from about 0.05 to about 0.45, alternatively from about 0.05 to about 0.30, alternatively from about 0.05 to about 0.25, or alternatively from about 0.10 to about 0.14 wherein the dynamic complex viscosity versus frequency scan are fitted to the Carreau-Yasuda equation with an n=0.1818 value.

In an aspect, the LPEPs are further characterized by a crossover modulus of from about 1 E+05 Pascals (Pa) to about 1 E+07 Pa; alternatively from about 1 E+05 Pa to about 1 E+06 Pa; or alternatively from about 1 E+05 Pa to about 6 E+05 Pa and a crossover frequency of from about 1 E+02 Pa to about 1 E+06 Pa; alternatively from about 1 E+02 Pa to about 1 E+06 Pa; or alternatively from about 1 E+03 Pa to about 1 E+06 Pa. The crossover modulus is determined by graphing the storage modulus and loss modulus as a function of shear rate. The storage modulus in viscoelastic materials measures the stored energy and represents the elastic portion of the material. The loss modulus relates to the energy dissipated as heat and represents the viscous portion related to the amount of energy lost due to viscous flow. The crossover modulus is the value of storage modulus (G') and loss modulus (G") at the crossover frequency ($\omega_c$) where G' and G" are equal.

A polymer of the type disclosed herein (i.e., LPEP) may be further characterized by the type/nature and the degree/amount of branching present in the polymer.

In an aspect, short chain branching is present in an LPEP and is characterized by the presence of short chain branches comprising $C_1$ branches and $C_{2+n}$ branches where n is an even number in the range of from about 30 to about 2, alternatively from about 12 to about 2, or alternatively from about 6 to about 2. In an aspect, an LPEP is characterized by the presence of short chain branches comprising ethyl groups, butyl groups, hexyl groups, 4-methylpentyl groups, octyl groups, or combinations thereof.

In an aspect, a LPEP of the type disclosed herein exhibits a degree of peak long chain branching (LCB), designated $\lambda_p$. In an aspect, a LPEP of the type disclosed herein has a $\lambda_p$ in the range of from about 0.02 LCB/$10^3$ carbons to about 0.35 LCB/$10^3$ carbons, alternatively from about 0.02 LCB/$10^3$ carbons to about 0.25 LCB/$10^3$ carbons, alternatively from about 0.05 LCB/$10^3$ carbons to about 0.25 LCB/$10^3$ carbons, or alternatively from about 0.1 LCB/$10^3$ carbons to about 0.2 LCB/$10^3$ carbons as determined by size exclusion chromatography multiangle laser light scattering (SEC-MALS).

In an aspect, the LPEP has a LCB distribution per molecule of from about 0 to about 20, alternatively from about 0 to about 14, alternatively from about 0 to about 12 at a $M_w$ of the LPEP ranging from about 1.00E+05 g/mol to about 3.00E+06 g/mol. In an alternative aspect, the LPEP has a LCB distribution per molecule of from about 0 to about 50, alternatively from about 5 to about 20, alternatively from about 6 to about 14, or alternatively from about 8 to about 10 at a $M_w$ of the LPEP ranging from about 1.00E+06 g/mol to about 3.00E+06 g/mol.

In an aspect, an LPEP of the type disclosed herein is further characterized by a LCB content peaking of from about 1.1E+05 g/mol to about 3.6E+06 g/mol, or alternatively from about 3.1E+05 g/mol to about 1.0E+06 g/mol. Herein the LCB content peaking refers to the maximum concentration of LCB as a function of molecular weight. The number of LCB per $10^3$ total carbons is calculated using the formula 1,000*$M_0$*B/M, where B is the number of LCB per chain, $M_0$ is the molecular weight of the repeating unit (e.g., the methylene group, —$CH_2$—, for polyethylene); and M is the molecular weight of a SEC slice where it is assumed that all macromolecules in the same SEC slice have the same molecular weight. B is calculated according to equation 4:

$$g = \frac{6}{B}\left\{\frac{1}{2}\left(\frac{2+B}{B}\right)^{1/2}\ln\left[\frac{(2+B)^{1/2}+(B)^{1/2}}{(2+B)^{1/2}-(B)^{1/2}}\right]-1\right\} \quad (4)$$

wherein g is defined as the ratio of the mean square radius of gyration ($R_g$) of a branched polymer to that of a linear polymer of the same molecular weight. Both the radius of gyration and the molecular weight may be determined via SEC-MALS. In an aspect, an LPEP of the type disclosed herein has an $R_g=-3E-12x^2+3E-5x+17.75$ at a $M_w$ of from about 1.00E+05 g/mol to about 5.00E+06 g/mol where x is the weight average molecular weight ($M_w$).

In an aspect, LPEPs of the type disclosed herein display an activation energy (also termed flow activation energy) of from about 35 kJ mol$^{-1}$ to about 60 kJ mol$^{-1}$, alternatively from about 35 kJ mol$^{-1}$ to about 50 kJ mol$^{-1}$, alternatively from about 35 kJ mol$^{-1}$ to about 45 kJ mol$^{-1}$, or alternatively from about 38 kJ mol$^{-1}$ to about 42 kJ mol$^{-1}$. The flow activation energy ($E_a$), also sometimes referred to as energy of activation, is the result of complex thermorheological behavior and may be calculated from rheological experiments measuring various parameters such as complex viscosities at different temperatures. For example the $E_a$ may be calculated according to an Arrhenius type equation over a limited temperature range, for example from 170 to 210° C., by substituting the complex viscosity $\eta^*$, and absolute temperature T, in the Arrhenius equation (5)

$$\eta^* = A^{(-Ea/RT)} \quad (5)$$

where A is the pre-exponential factor and R is the gas constant, 8.314 J K$^{-1}$ mol$^{-1}$. $E_a$ reflects the sensitivity of polymer melt viscosity to temperature. This is generally viewed as a function of the linear versus network character of the polymer. The molecular weight, the molecular weight distribution, and the degree of chain entanglement are also generally viewed as factors affecting the flow activation energy. Generally the viscosity of a polymer decreases with an increase in temperature and the size of the change with temperature is captured by the flow activation energy parameter, $E_a$.

A process of determining $E_a$ is called Time-Temperature Superposition (TTS). In concept this involves shifting the modulus curves both vertically and horizontally so that the data collapse to a single master curve. Using TTS first it is necessary to determine whether the polymer is thermorheologically simple or not. The test of this is the van Gurp Palmen plot of loss angle, $\delta$, vs. complex modulus, |G*|. If a polymer is thermorheologically simple the vGP curves for different temperatures will fall on a single curve. As indicated above, the TTS process involves shifting the complex modulus data both vertically and horizontally to obtain a master curve at some reference temperature. As the temperature T is raised, a polymer softens and its modulus decreases. A vertical shift factor, b(T), captures this effect, equations 6 and 7:

$$G^*(\omega, T_R) = G^*(\omega, T)b(T) \quad (6)$$

$$\text{where } b(T) = \rho(T_R)T_R/\rho(T)T. \quad (7)$$

$T_R$ is some reference temperature, usually 463.15 K (190° C.) for polyethylene (PE). The temperature values in the above equations are expressed in Kelvin. $\rho(T)$ is the density of the polymer at temperature T and is given by $\rho(T)=\rho_0-\Delta\rho(T-273.15)T$, T in Kelvin. The values of the constants are $\rho_0=0.86379$ g/cm$^3$ and $\Delta\rho=0.0005126$ g/cm$^3$/K for polyethylene. b(T) is close to one over the temperature range used for PE. The next conceptual step in the TTS procedure is to perform a horizontal shift. If T≥Tg+100 K, as it is for PE, then the horizontal shift factor has an Arrhenius form and a plot of horizontal shift factor, $\ln[\alpha(T)]$ vs. 1/T has a slope of $E_a/R$, where $E_a$ is the flow activation energy. If performed manually, the value of $\alpha(T)$ is determined at each temperature by shifting each (vertically shifted) modulus curve so that it falls on the curve at the reference temperature. The values of $\alpha(T)$ are then plotted vs. 1/T and from the slope, the value of the flow activation energy $E_a$ is determined. The master modulus curve is then converted to a master viscosity curve using equation 8:

$$|\eta^*|=|G^*|/(\alpha(T)\omega) \quad (8)$$

The equations used in the calculation are shown below as equations 9-11:

$$\ln[\alpha(T)] = \frac{E_a}{R}\left(\frac{1}{T} - \frac{1}{T_R}\right) \quad (9)$$

$$\eta_0(T_R) = b(T)\eta_0(T)/\alpha(T) \text{ and} \quad (10)$$

$$\tau_\eta(T_R) = b(T)\tau_\eta(T)/\alpha(T) \quad (11)$$

Once the master curve parameters are obtained from the fit [$\eta_0(T_R)$, $\tau_\eta(T_R)$, a, n, and $E_a$], viscosity data at any desired temperature can then be obtained by using the inverse equations, 12 and 13.

$$\eta_0(T) = \alpha(T)\eta_0(T_R)/b(T) \text{ and} \quad (12)$$

$$\tau_\eta(T) = \alpha(T)\tau_\eta(T_R)/b(T) \quad (13)$$

When temperature dependent data are analyzed, the procedure is to first combine the data from the different temperature measurements into a single file and then use this CY Analysis to obtain the master curve file and flow activation energy. The report would include a plot of the master curve, a plot of the data from the individual temperature measurements along with the calculated fits to those data, and the vGP plot of the individual temperature data to show that the polymer is thermorheologically simple.

Performing TTS gives a master curve that extends the range of the data at the reference temperature beyond the range that is actually measured. In particular, higher temperatures will extend the curve to lower frequencies and lower temperatures will extend it to higher frequencies. This technique is commonly used to obtain master curve data over much larger frequency ranges than one is capable of actually measuring. However, because the flow activation energy of PE is relatively small compared to some other polymers, and because it is a semicrystalline polymer that freezes around 130-140° C. and degrades much above 230° C., the frequency range can only be extended about half a decade for PE. Typically a minimum of three temperatures be used to determine $E_a$ and the temperatures normally used are 150, 190, and 230° C.

In an aspect, the LPEP is used in extrusion coating applications. Extrusion coating is the coating of a molten resin onto any suitable substrate. Nonlimiting examples of substrates suitable for coating with the LPEP include paperboard, paper, films, foils, nonwovens, wovens or combinations thereof. The LPEP may be utilized to provide an extrusion coating having a thickness of from about 0.05 mil to about 4.0 mil, alternatively from about 0.05 mil to about 2.0 mil, or alternatively from about 0.10 mil to about 1.0 mil.

The process of extrusion coating involves extruding molten resin (e.g., LPEP) from a slot die at temperatures typically of up to about 335° C. directly onto a moving substrate. However, it is contemplated that in some aspects, slot die temperatures may range from about 300° C. to about 650° C. or alternatively from about 320° C. to about ° C. The resin extruding from the slot die forms a curtain of molten resin (i.e., a polymer curtain) which is applied to the substrate. The slot die may have an operational width x that is the width along which molten resin may flow and form a polymer curtain having width x that is applied to the substrate. However, molten polymer extruding through the slot die may tend to exhibit some degree of shrinkage such that the polymer curtain does not maintain the full width at which it was extruded from the slot die. This phenomenon known as "neck-in" results in a tapering of the width of the polymer curtain that is applied to the substrate to a width designated y where y is less than x. Consequently, "neck-in" is defined herein as the difference between the die width (x) and the extrudate width on the substrate (y). The neck-in value δ is the difference between the width of the slot die (x) and the width of the polymer curtain when it contacts the substrate (y) such that δ=x−y and is reported herein in units of inches/side.

In an aspect, a LPEP of the type disclosed herein has a δ when extruded at a temperature in the range of from about 590° F. to about 645° F. and a coating speed of about 400 ft/min that is less than about 3.0 inches/side, alternatively less than about 2.5 inches/side, or alternatively less than about 1.7 inches/side. In another aspect, a LPEP of the type disclosed herein has a δ when extruded at a temperature in the range of from about 590° F. to about 645° F. and a coating speed of about 1000 ft/min that is less than about 3.0 inches/side, alternatively less than about 2.2 inches/side, or alternatively less than about 1.4 inches/side. In yet another aspect, a LPEP of the type disclosed herein has a δ when extruded at a temperature in the range of from about 590° F. to about 645° F. and a coating speed ranging from about 300 ft/min to about 1000 ft/min that is less than about 3.0 inches/side, or alternatively less than about 2.5 inches/side.

In an aspect, a LPEP of the type disclosed herein has a δ when extruded at a temperature in the range of from about 590° F. to about 645° F. and a coating speed of about 1000 ft/min that ranges from (z−0.25) inches/side to (z+1) inches/side where z is the neck-in value observed when extruding a low density polyethylene (LDPE) under similar conditions. For example, an LPEP of the type disclosed herein may be compared to MARFLEX 4517 commercially available from Chevron Phillips Chemical Co. Alternatively, a LPEP of the type disclosed herein has a δ when extruded at a temperature in the range of from about 590° F. to about 645° F. and a coating speed of about 1000 ft/min that ranges from ranges from (z−0.25) inches/side to (z+0.5) inches/side or alternatively ranges from (z−0.25) inches/side to (z) inches/side.

Further, as result of neck-in, an uneven amount of coating is applied onto the substrate where the amount of coating present on the outer edges of the substrate is greater than the amount of coating present on the interior portion of the substrate. The outer edges may be removed and discarded so as to recover that portion of substrate having an even thickness of coating. The material that is removed is termed "trim waste." An LPEP of the type disclosed herein may produce an amount of trim waste that is reduced by when compared to an LDPE such as MARFLEX 4517. The amount of trim waste produced may be inferred from the amount of neck-in produced.

An LPEP of the type disclosed herein may be further characterized by low edge weave values where "edge-weave" refers to the lateral variation in the edge of the polymer coating extruding onto a substrate. Edge weave can be obtained by measuring the width of the adhered polymer at its widest point and subtracting the width of the polymer at the narrowest point between polymer oscillations. For example, an LPEP of the type disclosed herein may have an edge weave value when extruded at a temperature in the range of from about 590° F. to about 645° F. and a coating speed of about 400 ft/min that is from about 0 inches/side to about 2.5 inches/side, alternatively from about 0 inches/side to about 1 inches/side, or alternatively about 0 inches/side.

In an aspect, an LPEP of the type disclosed herein may have an edge weave value when extruded at a temperature in the range of from about 590° F. to about 645° F. and a coating speed of about 1000 ft/min that is from about 0 inches/side to about 2.5 inches/side, alternatively from about 0 inches/side to about 1 inches/side, or alternatively about 0 inches/side. In yet another aspect, an LPEP of the type disclosed herein may have an edge weave value when extruded at a temperature in the range of from about 590° F. to about 645° F. and a coating speed ranging from about 300 ft/min to about 1000 ft/min that is from about 0 inches/side to about 2.5 inches/side, alternatively from about 0 inches/side to about 1 inches/side, or alternatively about 0 inches/side.

An LPEP of the type disclosed herein may be further characterized by a draw down value of from about 0.1 mils to about 10 mils, alternatively from about 0.1 mils to about 8 mils, or alternatively from about 0.1 mils to about 5 mils. Where "draw down" refers to the ability of the polymer melt to be stretched to produce a thin coat weight onto the substrate without tearing. In an aspect, draw down is a distance that is specified in "mils" where 1 mil is equal to one one-thousandth of an inch (i.e., 1 mil=0.001 inch). The LPEP of the present disclosure may also be characterized by a draw down rate of from 200:1 to 1:1, alternatively of from 170:1 to 5:1, or, alternatively of from 160:1 to 5:1.

Additional observations in processing may include that polymer resins of the type described herein (i.e., LPEP) may be extruded utilizing a motor load and head pressure less than or equal to that of an LDPE extruded under otherwise similar or alternatively identical conditions (e.g., MARFLEX 4517). Herein, the head pressure refers to the discharge pressure at the end of the extruder while the motor load refers to horsepower draw of the extruder. In an aspect, a LPEP may display a head pressure at 240 lbs/hr that is equal to or reduced by 40% when compared to that of an LDPE (e.g., MARFLEX 4517) extruded under otherwise similar or alternatively identical conditions; alternatively equal to or reduced by 50%, alternatively reduced by from about 60% to about 90%, or alternatively reduced by from about 60% to about 70%. In an aspect, a LPEP may display a motor load at 240 lbs/hr that is equal to or reduced by 40% when compared to that of an LDPE extruded under otherwise similar or alternatively identical conditions; alternatively equal to or reduced by 50%, alternatively reduced by from about 50% to about 80%, or alternatively reduced by from about 50% to about 70%.

In an aspect, films formed from an LPEP of this disclosure have an Elmendorf tear strength in the machine direction (MD) of from about 0 g/lb/ream to about 25.0 g/lb/ream, alternatively of from about 1.0 g/lb/ream to about 15.0 g/lb/ream, alternatively of from about 1.0 g/lb/ream to about 10.0 g/lb/ream, or alternatively of from about 2.0 g/lb/ream to about 8.0 g/lb/ream. In an aspect, films formed from PE polymers of this disclosure have an Elmendorf tear strength in the transverse direction (TD) of from about 0 g/lb/ream to about 25.0 g/lb/ream, alternatively of from about 1.0 g/lb/ream to about 15.0 g/lb/ream, alternatively of from about 1.0 g/lb/ream to about 10.0 g/lb/ream, or alternatively of from about 2.0 g/lb/ream to about 8.0 g/lb/ream. The Elmendorf tear strength refers to the average force required to propagate tearing through a specified length of plastic film or nonrigid sheeting on an Elmendorf-type tear tester. Specifically, test specimens having a pre-cut slit are contacted with a knife-tipped pendulum. The average force required to propagate tearing is calculated from the pendulum energy lost while tearing the test specimen. The tear may be propagated either in the MD or TD and may be measured in accordance with ASTM D1922 using a test specimen having a 1.0 mil thickness.

Examples of markets for extrusion coating include without limitation a variety of end-use applications such as liquid packaging, photographic, flexible packaging, and other commercial applications. In an aspect, the LPEP is used to form an extrusion coating that is used to seal or close a package. Heat sealing is the major technique used for forming and closing flexible packages. Heat is used to rapidly activate a sealant layer comprised of a heat sealable material, usually a polymeric resin (e.g., LPEP). The temperature required to activate the heat sealable material and form a durable seal is termed the seal initiation temperature (SIT) and the ability of the seal to resist opening immediately after being formed is termed hot tack. The temperature range over which a durable seal can be formed and maintained is termed the hot tack window. In an aspect, an LPEP has a hot tack initiation temperature of equal to or less than about 135° C., alternatively equal to or less than about 125° C., alternatively equal to or less than about 120° C., alternatively from about 90° C. to about 135° C., alternatively from about 90° C. to about 125° C., or alternatively from about 90° C. to about 117° C. as determined in accordance with ASTM F 1921 at 1 Newton of force and 25 mm.

Coatings formed from the LPEPs of this disclosure may exhibit a seal strength ranging from about 2.0 lbf/in to about 25.0 lbf/in, alternatively ranging from about 2.0 lbf/in to about 12.5 lbf/in, alternatively ranging from about 2.0 lbf/in to about 10.0 lbf/in, or alternatively ranging from about 2.0 lbf/in to about 8.0 lbf/in as determined in accordance with ASTM F 88.

The polymers disclosed herein (i.e., LPEPs) may be formed into various articles, including, but not limited to, bottles, drums, toys, household containers, utensils, film products, drums, fuel tanks, pipes, geomembranes, and liners. Various processes may be used to form these articles, including, but not limited to, blow molding, extrusion molding, rotomolding, thermoforming, cast molding and the like. In an aspect, the polymers of this disclosure are fabricated into an article by a shaping process such as blowmolding, extrusion blow molding, injection blow molding or stretch blow molding.

EXAMPLES

For each of the following examples molecular weights and molecular weight distributions were obtained using a PL 220 GPC/SEC high temperature chromatography unit (Polymer Laboratories, now an Agilent Company) with 1,2,4-trichlorobenzene (TCB) as the solvent, with a flow rate of 1 mL/minute at a temperature of 145° C. BHT (2,6-di-tert-butyl-4-methylphenol) at a concentration of 0.5 g/L was used as a stabilizer in the TCB. An injection volume of 400 µL was used with a nominal polymer concentration of 1.0 mg/mL. Dissolution of the sample in stabilized TCB was carried out by heating at 150° C. for about 5 hours with occasional, gentle agitation. The columns used were three PLgel 20 m Mixed A LS columns (7.5×300 mm) and were calibrated with the integral method using a broad linear polyethylene standard (Chevron Phillips Chemical Company Marlex® BHB 5003 polyethylene) for which the molecular weight distribution had been determined. An IR4 detector (Polymer Char, Spain) was used for the concentration detection.

Extrusion coating evaluations for the resins of this disclosure were performed on a commercial-scale GPC (Guardian Packaging Corporation) extrusion coating line. This line was used in a monolayer configuration and was equipped with a 4.5 inch single flite screw, 24:1 L/D extruder, CLOEREN variable geometry feedblock, and a 40-inch CLOEREN EBR IV internally deckled die. A die width of 32 inches was used for the entire study. The extruder metering zones, pipes, feedblock and die were set to 610° F. and the output rate was fixed at 200 lb/hr. The draw distance from the die to nip roll was fixed at 8 inches. The chill roll was matte finish and controlled to 65° F. Line speed was increased incrementally from 300 ft/min. to 500 ft/min. to 700 ft/min. to 900 ft/min. and then finally to 1100 ft/min., in order to measure neck-in performance at a range of line speeds as well as to determine if and when edge-weave and edge-tear were encountered. The resin was coated onto a 35# natural Kraft paper substrate, which was pre-treated using a PILLAR corona treater. Polyethyleterephtalate (PET) "slip sheets" were also placed between the extrudate and the paper, while at steady-state conditions, in order to produce samples where the extrudate could be cleanly removed from the substrate for coat weight and haze testing.

Example 1

The LPEPs of the present disclosure were prepared using the dual metallocene-based catalyst systems disclosed herein, examples of which are included in Table 1. The resins presented in Table 1 are copolymers of ethylene and 1-hexene comonomer which were copolymerized in the Phillips type slurry-loop pilot plant. Ethylene copolymers were prepared in a continuous particle form process (also known as a slurry process) by contacting the catalyst of the present disclosure with ethylene and 1-hexene comonomer. The polymerization medium and polymerization temperature are thus selected such that the copolymer is produced in the form of solid particles and is recovered in that form. General polymerization reaction details are as follows.

Ethylene was dried over activated alumina was used as the monomer. Isobutane that had been degassed by fractionation and dried over activated alumina was used as the diluent.

The general preparation of the metallocene solutions was carried out as follows. The metallocenes, solvents, and metal alkyls were charged, under nitrogen, to a steel vessel, and diluted with isobutane to give a total weight of 40 pounds. These catalysts solutions were then feed to the precontactor as described below.

The polymerization reactor was a liquid-full 15.2 cm diameter pipe loop having a volume of 23 (87 liters) or 27 gallons. The fluorided silica-alumina, the 0.1% triethylaluminum solution in isobutane, the metallocene solution or solutions prepared as indicated above, and a portion of the total isobutane diluent were all fed to the reactor through a precontacting vessel (0.5 or 2.0 Liters), where the three ingredients contacted each other at room temperature for about 10 to about 30 minutes, before entering the reaction zone. The precontactor was a stirred, Autoclave Engineers Magnadrive reactor with a volume of either 0.5 or 2.0 Liters, which fed directly into the loop reactor. The chemically treated solid oxide (CTSO) was added to the precontactor through a 0.35 cc circulating ball-check feeder using a small isobutane flow, as indicated herein. The reactor pressure was about 4 Mpa (about 580 psi). The reactor temperature was varied over a range, from about 65° C. to about 110° C., as indicated. The polymerization reactor was operated to have a residence time of 1.25 hours. At steady-state conditions the total isobutane feed rate was about 46 liters per hour, the ethylene feed rate was about 30 lbs/hr and the 1-hexene feed rate was varied to control the density of the polymer product. Ethylene concentration in the diluent was from about 14 to about 20 mole percent. Catalyst concentrations in the reactor are such that the CTSO system content typically ranges from 0.001 to about 1 weight percent based on the weight of the reactor contents. Polymer was removed from the reactor at the rate of about 25 lbs per hour and recovered in a flash chamber. A Vulcan dryer was used to dry the polymer under nitrogen at a temperature from about 60° C. to about 80° C.

To prevent static buildup in the reactor, a small amount (<5 ppm relative to diluent) of a commercial antistatic agent sold as STADIS 450 was usually added. The polymer fluff was subsequently extruded off-line into pellets on a Werner & Pfleidder ZSK-40 twin-screw extruder in the absence of any stabilization additives.

Example 2

Five samples of LPEPs of the type disclosed herein, designated LPEP 1-5, and three comparative resins, (C1), (C2) and (C3) are presented in Table 1. C1 is MARLEX® 4517 polyethylene which is a low density polyethylene commercially available from Chevron Phillips Chemical Company; C2 and C3 are disclosed in U.S. Pat. No. 7,041,617, which is incorporated by reference herein, in its entirety, as DC-C-2 and DC-B-1, respectively. Each resin among LPEP 1-5 improves upon the neck-in properties of resins DC-C-2 and DC-B-1, which displayed the most favorable neck-in properties in previous studies.

The basic descriptions in terms of melt index and density for the experimental resins along with the catalyst system identification are provided in Table 1. Generally, the experimental resins ranged in MI from about 3 g/10 min to about 20 g/10 min. and ranged in density from about 0.920 to about 0.950 g/cm$^3$. Average neck-in for LPEPs 1-5 ranged from 1.34 to 1.44 and in all cases was significantly better than the commercially available is MARLEX® 4517 (Sample C1). Each resin among LPEP 1-5 also displayed zero edge-weave.

TABLE 1

| Sample | Melt index (g/ 10 min.) | Density g/ml | Catalyst Type | Average Neck - in (inches/ side) @900-1000 ft/min | Average Edge Weave (inches) @900-1000 ft/min | Minimum Coating Thickness (mils) @900-1000 ft/min |
|---|---|---|---|---|---|---|
| C1 | 3.1 | 0.923 | Radical | 1.57 | 0 | 0.17 |
| C2 | 12.3 | 0.922 | Dual | 3.28 | n/a | n/a |
| C3 | 8.3 | 0.926 | Dual | 3.89 | n/a | n/a |
| LPEP-1 | 17.9 | 0.943 | Dual | 1.38 | 0 | 0.38 |
| LPEP-2 | 18.0 | 0.944 | Dual | 1.35 | 0 | 0.36 |
| LPEP-3 | 17.0 | 0.944 | Dual | 1.44 | 0 | 0.33 |
| LPEP-4 | 20.4 | 0.942 | Dual | 1.34 | 0 | 0.28 |
| LPEP-5 | 24.7 | 0.942 | Dual | 1.39 | 0 | 0.28 |

The results demonstrate the surprising and unexpectedly beneficial absence of edge weave for LPEPs of the type disclosed herein. Further, LPEPs of the type disclosed herein displayed low neck-in and high draw down (high maximum line speed). LPEPs 1-5 did not tear at line speeds 900-1000 ft/min. and are therefore suitable for use in commercially-practiced extrusion coating where line speeds are typically in the range of about 500-900 ft/min. The LPEPs of this disclosure exhibited extensional viscosities at 100 s$^{-1}$ (EEta@100) and dynamic viscosity at 0.03 rad/s (Eta@0.03) that correlated with the neck-in and maximum line speed values observed.

The following enumerated aspects are provided as non-limiting examples.

A first aspect which is a polyolefin having a density of greater than about 0.930 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side.

A second aspect which is the polyolefin of the first aspect having a short chain branching comprising $C_1$ groups and $C_{2+n}$ groups where n is an even number and a peak long chain branching of from about 0.02 to about 0.35 per thousand carbon atoms.

A third aspect which is the polyolefin of any of the first through second aspects having an Eta@0.03 of from about $3\times10^2$ Pa·s to about $1\times10^4$ Pa·s and an EEta@100 of from about $3\times10^3$ Pa·s to about $5\times10^4$ Pa·s.

A fourth aspect which is the polyolefin of any of the first through third aspects having a Carreau-Yasuda a (CY-a) value of from about 0.05 to about 0.45.

A fifth aspect which is the polyolefin of any of the first through fourth aspects having a flow activation energy ($E_a$) of from about 35 kJ/mol to about 60 kJ/mol.

A sixth aspect which is the polyolefin of any of the first through fifth aspects comprising polyethylene.

A seventh aspect which is a polyolefin having a density of greater than about 0.930 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side, a neck-in of less than about 3.0 in/side, and short chain branching comprising ethyl moieties, butyl moieties, hexyl moieties, 4-methylpentyl moieties, octyl moieties or combinations thereof.

An eighth aspect which is a polyolefin having a Carreau-Yasuda a (CY-a) value of from about 0.05 to about 0.45.

A ninth aspect which is the polyolefin of any of the seventh through eighth aspects having a flow activation energy ($E_a$) of from about 35 kJ/mol to about 60 kJ/mol.

A tenth aspect which is the polyolefin of any of the seventh through ninth aspects comprising polyethylene.

An eleventh aspect which is a polyolefin having a density of from about 0.89 g/ml to about 0.98 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side wherein the polyolefin has short chain branching comprising ethyl groups, butyl groups, hexyl groups, 4-methylpentyl groups, octyl groups or combinations thereof.

A twelfth aspect which is the polyolefin of the eleventh aspect having a peak long chain branching of from about 0.02 to about 0.35 per thousand carbon atoms.

A thirteenth aspect which is the polyolefin of any of the eleventh through twelfth aspects having an Eta@0.03 of from about $3\times10^2$ Pa·s to about $1\times10^4$ Pa·s and an EEta@100 of from about $3\times10^3$ Pa·s to about $5\times10^4$ Pa·s.

A fourteenth aspect which is the polyolefin of any of the eleventh through thirteenth aspects having a Carreau-Yasuda a (CY-a) value of from about 0.05 to about 0.45.

A fifteenth aspect which is the polyolefin of any of the eleventh through fourteenth aspects having a flow activation energy ($E_a$) of from about 35 kJ/mol to about 60 kJ/mol.

A sixteenth aspect which is the polyolefin of any of the eleventh through fifteenth aspects comprising polyethylene.

A seventeenth aspect which is a polyolefin having a density of from about 0.915 g/ml to about 0.975 g/ml which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side wherein the polyolefin has short chain branching comprising ethyl groups, butyl groups, hexyl groups, 4-methylpentyl groups, octyl groups or combinations thereof.

A eighteenth aspect which is a polyolefin having a melt index of from about 0 g/10 min. to about 50 g/10 which when extruded at a temperature in the range of from about 590° F. to about 645° F. and then coated onto a substrate at a rate of from about 300 ft/min. to about 1000 ft/min. has an edge weave of from about 0 in/side to about 2.5 in/side and a neck-in of less than about 3.0 in/side wherein the polyolefin has short chain branching comprising $C_1$ groups and $C_{2+n}$ groups where n is an even number.

A nineteenth aspect which is the polyolefin of the eighteenth aspect having an Eta@0.03 of from about $3\times10^2$ Pa·s to about $1\times10^4$ Pa·s and an EEta@100 of from about $3\times10^3$ Pa·s to about $5\times10^4$ Pa·s.

A twentieth aspect which is the polyolefin of any of the eighteenth through nineteenth aspects having a density of greater than about 0.930 g/ml.

A twenty-first aspect which is the polyolefin of any of the eighteenth through twentieth aspects having a drawdown of from about 0.1 mils to about 5 mils and a drawdown rate of 200 to 1:1.

A twenty-second aspect which is a method comprising extruding the polyolefin of any of the eighteenth through twenty-first aspects onto a substrate to form an extrusion coated substrate.

A twenty-third aspect which is an article formed from the extrusion coated substrate of the twenty-second aspect.

A twenty-fourth aspect which is the polyolefin of any of the first through sixth aspects having a reduction in gel level of from about 20% to about 80% compared to an otherwise similar polyolefin prepared in the absence of hydrogen.

Without further elaboration, it is believed that one skilled in the art can, using the description herein, utilize the present disclosure to its fullest extent. While aspects of the disclosure have been shown and described, modifications thereof can be made by one skilled in the art without departing from the spirit and teachings of the aspects. The aspects and examples described herein are exemplary only, and are not intended to be limiting. Many variations and modifications of the aspects disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present disclosure. Thus, the claims are a further description and are an addition to the detailed description of the present disclosure. The disclosures of all patents, patent applications, and publications cited herein are hereby incorporated by reference, to the extent that they provide exemplary, procedural or other details supplementary to those set forth herein.

What is claimed:

1. A polyolefin having a density of greater than about 0.930 g/mL which when extruded at a temperature in the range of from about 590° F. to about 645° F. and then coated onto a substrate at a rate of from about 300 ft/min to about 1000 ft/min has an edge weave of from about 0 in/side to about 2.5 in/side and a neck-in of less than about 3.0 in/side.

2. The polyolefin of claim 1 having a short chain branching comprising $C_1$ groups and $C_{2+n}$ groups where n is an even number and a peak long chain branching of from about 0.02 to about 0.35 per thousand carbon atoms.

3. The polyolefin of claim 1 having an Eta@0.03 of from about $3\times10^2$ Pa·s to about $1\times10^4$ Pa·s and an EEta@100 of from about $3\times10^3$ Pa·s to about $5\times10^4$ Pa·s.

4. The polyolefin of claim 1 having a Carreau-Yasuda a (CY-a) value of from about 0.05 to about 0.45.

5. The polyolefin of claim 1 having a flow activation energy ($E_a$) of from about 35 kJ/mol to about 60 kJ/mol.

6. The polyolefin of claim 1 comprising polyethylene.

7. A polyolefin having a density of greater than about 0.930 g/mL which when extruded at a temperature in the range of from about 590° F. to about 645° F. and then coated onto a substrate at a rate of from about 300 ft/min to about 1000 ft/min has an edge weave of from about 0 in/side to about 2.5 in/side, a neck-in of less than about 3.0 in/side, and short chain branching comprising ethyl moieties, butyl moieties, hexyl moieties, 4-methylpentyl moieties, octyl moieties or combinations thereof.

8. The polyolefin of claim 7 having a Carreau-Yasuda a (CY-a) value of from about 0.05 to about 0.45.

9. The polyolefin of claim 7 having a flow activation energy ($E_a$) of from about 35 kJ/mol to about 60 kJ/mol.

10. The polyolefin of claim 7 comprising polyethylene.

11. A polyolefin having a density of from about 0.89 g/mL to about 0.98 g/mL which when extruded at a temperature in the range of from about 590° F. to about 645° F. and then coated onto a substrate at a rate of from about 300 ft/min to about 1000 ft/min has an edge weave of from about 0 in/side to about 2.5 in/side and a neck-in of less than about 3.0 in/side wherein the polyolefin has short chain branching comprising ethyl groups, butyl groups, hexyl groups, 4-methylpentyl groups, octyl groups or combinations thereof.

12. The polyolefin of claim 11 having a peak long chain branching of from about 0.02 to about 0.35 per thousand carbon atoms.

13. The polyolefin of claim 11 having an Eta@0.03 of from about $3\times10^2$ Pa·s to about $1\times10^4$ Pa·s and an EEta@100 of from about $3\times10^3$ Pa·s to about $5\times10^4$ Pa·s.

14. The polyolefin of claim 11 having a Carreau-Yasuda a (CY-a) value of from about 0.05 to about 0.45.

15. The polyolefin of claim 11 having a flow activation energy ($E_a$) of from about 35 kJ/mol to about 60 kJ/mol.

16. The polyolefin of claim 11 comprising polyethylene.

17. A polyolefin having a density of from about 0.915 g/mL to about 0.975 g/mL which when extruded at a temperature in the range of from about 590° F. to about 645° F. and then coated onto a substrate at a rate of from about 300 ft/min to about 1000 ft/min has an edge weave of from about 0 in/side to about 2.5 in/side and a neck-in of less than about 3.0 in/side wherein the polyolefin has short chain branching comprising ethyl groups, butyl groups, hexyl groups, 4-methylpentyl groups, octyl groups or combinations thereof.

18. A polyolefin having a melt index of from about 0 g/10 min to about 50 g/10 min which when extruded at a temperature in the range of from about 590° F. to about 645° F. and then coated onto a substrate at a rate of from about 300 ft/min to about 1000 ft/min has an edge weave of from about 0 in/side to about 2.5 in/side and a neck-in of less than about 3.0 in/side wherein the polyolefin has short chain branching comprising $C_1$ groups and $C_{2+n}$ groups where n is an even number.

19. The polyolefin of claim 18 having an Eta@0.03 of from about $3\times10^2$ Pa·s to about $1\times10^4$ Pa·s and an EEta@100 of from about $3\times10^3$ Pa·s to about $5\times10^4$ Pa·s.

20. The polyolefin of claim 18 having a density of greater than about 0.930 g/ml.

21. The method of claim 18 wherein the polyolefin has a draw down value of from about 0.1 mils to about 5 mils and a draw down ratio of 200:1 to 1:1.

22. A method comprising extruding the polyolefin of claim 18 onto a substrate to form an extrusion coated substrate.

23. An article formed from the extrusion coated substrate prepared by the method of claim 22.

* * * * *

UNITED STATES PATENT AND TRADEMARK OFFICE
CERTIFICATE OF CORRECTION

| | | |
|---|---|---|
| PATENT NO. | : 9,975,976 B1 | |
| APPLICATION NO. | : 15/489663 | |
| DATED | : May 22, 2018 | |
| INVENTOR(S) | : Chung Tso et al. | |

It is certified that error appears in the above-identified patent and that said Letters Patent is hereby corrected as shown below:

In the Claims

Claims 21-23, Column 32, Lines 58-65, replace:
"21. The method of claim 18 wherein the polyolefin has a draw down value of from about 0.1 mils to about 5 mils and a draw down ratio of 200:1 to 1:1.
22. A method comprising extruding the polyolefin of claim 18 onto a substrate to form an extrusion coated substrate.
23. An article formed from the extrusion coated substrate prepared by the method of claim 22."

With:
--21. A method comprising extruding the polyolefin of claim 18 onto a substrate to form an extrusion coated substrate.
22. The method of claim 21 wherein the polyolefin has a draw down value of from about 0.1 mils to about 5 mils and a draw down ratio of 200:1 to 1:1.
23. An article formed from the extrusion coated substrate prepared by the method of claim 21.--

Signed and Sealed this
First Day of January, 2019

Andrei Iancu
*Director of the United States Patent and Trademark Office*